US011748832B2

(12) United States Patent
Carothers et al.

(10) Patent No.: US 11,748,832 B2
(45) Date of Patent: Sep. 5, 2023

(54) LEGAL TIMELINE ANALYTICS

(71) Applicant: Lex Machina, Inc., Menlo Park, CA (US)

(72) Inventors: Gavin Carothers, Sebastopol, CA (US); Karl Harris, Mountain View, CA (US); Brian C. Howard, San Francisco, CA (US); John Lehmann, Richardson, TX (US); Timothy Wade Malone, Menlo Park, CA (US); Nicholas O. Pilon, Sebastopol, CA (US)

(73) Assignee: LEX MACHINA, INC., Menlo Park, CA (US)

( * ) Notice: Subject to any disclaimer, the term of this patent is extended or adjusted under 35 U.S.C. 154(b) by 159 days.

(21) Appl. No.: 17/097,137

(22) Filed: Nov. 13, 2020

(65) Prior Publication Data

US 2021/0065323 A1 Mar. 4, 2021

Related U.S. Application Data

(63) Continuation of application No. 16/002,449, filed on Jun. 7, 2018, now Pat. No. 10,853,896, which is a (Continued)

(51) Int. Cl.
*G06Q 50/18* (2012.01)
*G06Q 10/10* (2023.01)
(Continued)

(52) U.S. Cl.
CPC ........... *G06Q 50/18* (2013.01); *G06F 3/0484* (2013.01); *G06F 16/2322* (2019.01);
(Continued)

(58) Field of Classification Search
CPC .... G06F 16/93; G06F 16/2428; G06F 16/338; G06F 16/345; G06F 16/2322; G06F 16/25; G06F 16/24; G06Q 50/18; G06Q 10/10
See application file for complete search history.

(56) References Cited

U.S. PATENT DOCUMENTS 7,711,738 B1 * 5/2010 Kraft .................... G06F 16/958
707/769
8,935,229 B1 * 1/2015 Ritchey ................. G06Q 10/10
707/723

(Continued)

FOREIGN PATENT DOCUMENTS

CA 2 512 488 A1 7/2004

OTHER PUBLICATIONS

Notification of Transmittal of The International Search Report and The Written Opinion of the International Searching Authority; PCT/US16/29066; filed Apr. 22, 2016; dated Sep. 9, 2016.

*Primary Examiner* — Etienne P Leroux
(74) *Attorney, Agent, or Firm* — DINSMORE & SHOHL LLP

(57) ABSTRACT

Various of the disclosed embodiments concern systems and methods for applying legal analytics. In some embodiments, a legal analytics platform retrieves legal data from an electronic database, analyzes some or all of the legal data, and identifies interesting patterns and results of statistical analyses. In order to permit searching of the legal data, metadata elements or tags can be generated for legal entities and legal events. In some embodiments, the legal analytics platform identifies timestamps in the legal data and performs time-based statistical analysis. Results of the statistical analyses can be presented to a user via a graphical user interface (GUI), which may also allow the user to interact (Continued)

with the legal analytics platform and search one or more databases of legal data.

23 Claims, 22 Drawing Sheets

Related U.S. Application Data continuation of application No. 14/823,627, filed on Aug. 11, 2015, now Pat. No. 10,043,228.

(60) Provisional application No. 62/151,310, filed on Apr. 22, 2015.

(51) Int. Cl.
| | |
|---|---|
| *G06F 16/24* | (2019.01) |
| *G06F 16/25* | (2019.01) |
| *G06F 16/93* | (2019.01) |
| *G06F 16/338* | (2019.01) |
| *G06F 16/34* | (2019.01) |
| *G06F 16/23* | (2019.01) |
| *G06F 16/242* | (2019.01) |
| *G06F 3/0484* | (2022.01) |

(52) U.S. Cl.
CPC .......... *G06F 16/24* (2019.01); *G06F 16/2428* (2019.01); *G06F 16/25* (2019.01); *G06F 16/338* (2019.01); *G06F 16/345* (2019.01); *G06F 16/93* (2019.01); *G06Q 10/10* (2013.01)

(56) References Cited

U.S. PATENT DOCUMENTS

| | | | |
|---|---|---|---|
| 10,853,896 B2* | 12/2020 | Carothers | .............. G06Q 10/10 |
| 2008/0133468 A1 | 6/2008 | Oettinger et al. | |
| 2010/0076972 A1 | 3/2010 | Baron et al. | |
| 2011/0289105 A1 | 11/2011 | Hershowitz | |
| 2011/0302210 A1 | 12/2011 | Comanescu | |
| 2012/0005232 A1 | 1/2012 | Oleynik | |
| 2012/0310688 A1* | 12/2012 | Jackson | ................. G06Q 10/10 |
| | | | 705/7.11 |
| 2013/0246310 A1 | 9/2013 | Weiss et al. | |
| 2013/0326620 A1 | 12/2013 | Merza et al. | |
| 2014/0089035 A1 | 3/2014 | Jericho et al. | |
| 2014/0114962 A1 | 4/2014 | Rosenburg et al. | |
| 2014/0195403 A1 | 7/2014 | Lee et al. | |

* cited by examiner

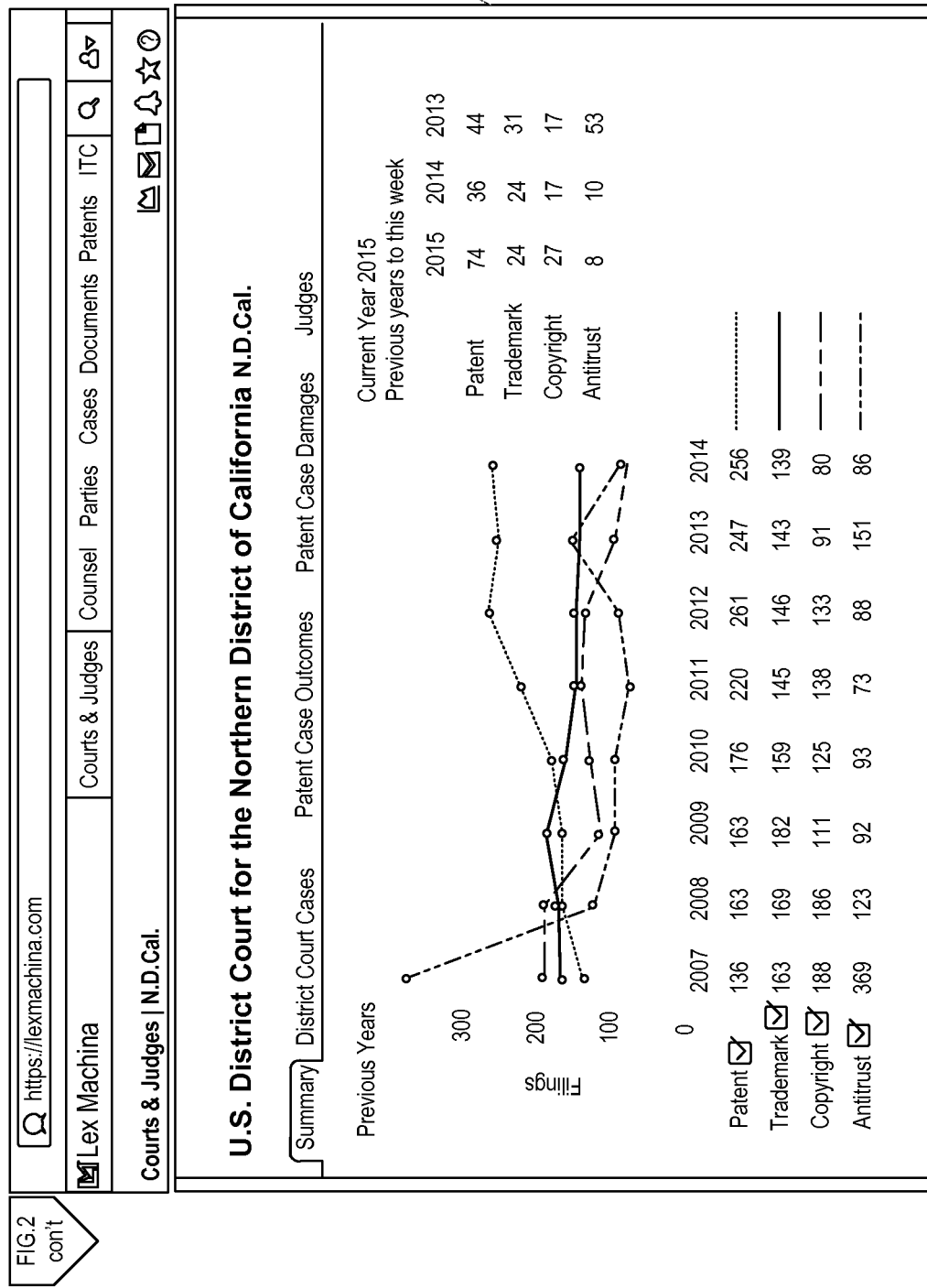
FIG. 2 (con't)

FIG. 11

LEGAL TIMELINE ANALYTICS

CLAIM OF PRIORITY

This application is a continuation of U.S. patent application Ser. No. 16/002,449, entitled "LEGAL TIMELINE ANALYTICS," filed Jun. 7, 2018, which is a continuation of U.S. patent application Ser. No. 14/823,627, entitled "LEGAL TIMELINE ANALYTICS," filed Aug. 11, 2015, which claims the benefit of U.S. Provisional Patent Application No. 62/151,310, entitled "LEGAL ANALYTICS BASED ON PARTY, JUDGE, OR LAW FIRM," filed Apr. 22, 2015, each of which is incorporated by reference herein in its entirety.

CROSS-REFERENCE TO RELATED APPLICATION(S)

The present application is related to U.S. patent application Ser. No. 14/823,461, titled "LEGAL ANALYTICS BASED ON PARTY, JUDGE, OR LAW FIRM," filed Aug. 11, 2015, U.S. patent application Ser. No. 14/823,496, titled "ANALYZING AND CHARACTERIZING LEGAL CASE OUTCOMES," filed Aug. 11, 2015, and U.S. patent application Ser. No. 14/823,653, titled "MOTION MAPPING AND ANALYTICS," filed Aug. 11, 2015, all incorporated herein by reference.

COPYRIGHT NOTICE

A portion of this patent document contains material that is subject to copyright protection. To the extent required by law, the copyright owner has no objection to the facsimile reproduction of the document, as it appears in the U.S. Patent and Trademark Office patent file or records, but otherwise reserves all copyright rights whatsoever.

FIELD OF THE INVENTION

Various embodiments relate generally to computer applications. More specifically, various embodiments relate to legal analytics systems and methods for discovering meaningful patterns in legal data.

BACKGROUND

Intellectual property has become increasingly more prominent as a business asset. For example, patent assets have received increased media attention as they have been the subject of business transactions, such as patent auctions, and contested matters, such as patent litigation.

The United States has seen an explosion in patent litigation lawsuits in recent years. For example, according to data aggregated by Lex Machina, Inc., of Menlo Park, Calif., in 2000 there were 2,281 patent lawsuits filed. By 2011, that number had climbed to 3,557. And, in 2013, a record 6,082 patent lawsuits were filed. Recent trends in litigation have also motivated renewed interest in trademark, copyright, and antitrust litigation.

Conventionally, attorneys, law students, legal professionals, etc., required access to various information when doing legal research, such as case opinions, statutes, and law review articles. Oftentimes, the information is stored in a variety of forms across a variety of different sources (e.g., hard copy materials, electronic databases) that makes research difficult and time-consuming. Access to more than one type or source of information is often desirable, if not necessary, before determining what actions to take. Although online legal research services, such as Westlaw® and LexisNexis®, have significantly improved accessibility of legal documents and legal information, they do little to make determining the proper course of action easier.

Online legal research services serve largely as electronic databases for legal and public-records related information. As such, they provide significant, but limited, value to those doing legal research. For example, an attorney that is researching strategies for a patent litigation proceeding in the U.S. District Court for the North District of California may have access to information through services such as Westlaw®, LexisNexis®, Public Access to Court Electronic Records (PACER), Patent Application Information Retrieval (PAIR), Electronic Document Information System (EDIS), etc. Yet determining what strategies are most likely to succeed in a particular jurisdiction, in front of a particular judge, or against opposing counsel, still remains ad hoc and instinctual.

SUMMARY

Systems and methods are described for acquiring, analyzing, and discovering meaningful patterns within legal data. In various embodiments, a method includes accessing a source of information (e.g., an electronic database) and obtaining legal data from the source. The source may be accessed over a network (e.g., Internet, a local area network, a wide area network, a point-to-point dial-up connection) by a legal analytics system. Legal constructs in the form of metadata can be recognized by the system and mapped to legal entities, legal events, timestamps, etc. Pieces of metadata, also called "metadata elements," may be associated with the legal data, thereby indicating the presence of one or more legal entities, events, timestamps, etc. That is, the legal data can be "tagged" using metadata. In some embodiments, some or all of the legal data is used to construct a database that is searchable by using the metadata. That is, a user (e.g., lawyer, law student) could search the database for legal data associated with a particular legal entity or event.

In various embodiments, the method further includes generating a graphical user interface (GUI) that allows the user to specify search parameters with which to search the database, present search results, and/or allow the user to modify the search parameters. The search result can include textual, tabular, or graphical summaries of the relevant legal data. Some embodiments present the relevant legal data in more than one way (e.g., tabular and graphical summary). The GUI can be configured to be presented by a web application or web-based portal, web browser, or a mobile application adapted for a cellular device, personal digital assistant (PDA), tablet, personal computer, etc.

The method may also include identifying and normalizing inaccuracies (e.g., typos, misspellings) in the legal data. In some embodiments, the method permits an administrator (e.g., individual, computing system) to modify the legal data and/or input supplementary legal data. The supplementary legal data may be, for example, legal entities, outcomes, events, etc., that were not properly recognized by the legal analytics system.

In various embodiments, a method includes identifying timestamps within the legal data that identify the occurrence of a legal event and forming subsets of timestamps grouped by legal event. A statistical analysis may be performed on one or more subsets, thereby generating values (e.g., median time, minimum time) that may be useful in determining future behavior. In some embodiments, the timestamps are also associated with one or more pieces of metadata, which allows the statistical analysis to be performed on a subset of timestamps for a particular legal entity, event, etc.

In various embodiments, a method includes identifying electronic legal documents within the legal data, performing word recognition on the documents, and associating each document with a legal entity, event, etc., based on any recognized words. Sets of related documents may be constructed in some embodiments.

The legal analytics system described herein can include, or be connected to, a storage that includes some or all of the legal data, supplementary legal data, and tags. In some embodiments, the storage also includes search results or analytics reports previously generated for a particular user, a particular legal entity, etc. The legal analytics system may include Natural Language Processing (NLP) and/or machine learning modules that can be used to improve the system's accuracy in identifying relevant data and discovering patterns.

BRIEF DESCRIPTION OF THE DRAWINGS

These and other objects, features, and characteristics will become more apparent to those skilled in the art from a study of the following Detailed Description in conjunction with the appended claims and drawings, all of which form a part of this specification. While the accompanying drawings include illustrations of various embodiments, the drawings are not intended to limit the claimed subject matter.

FIGS. 9, 10, and 11 are screenshots of GUIs in accordance with various embodiments.

Figure 1:
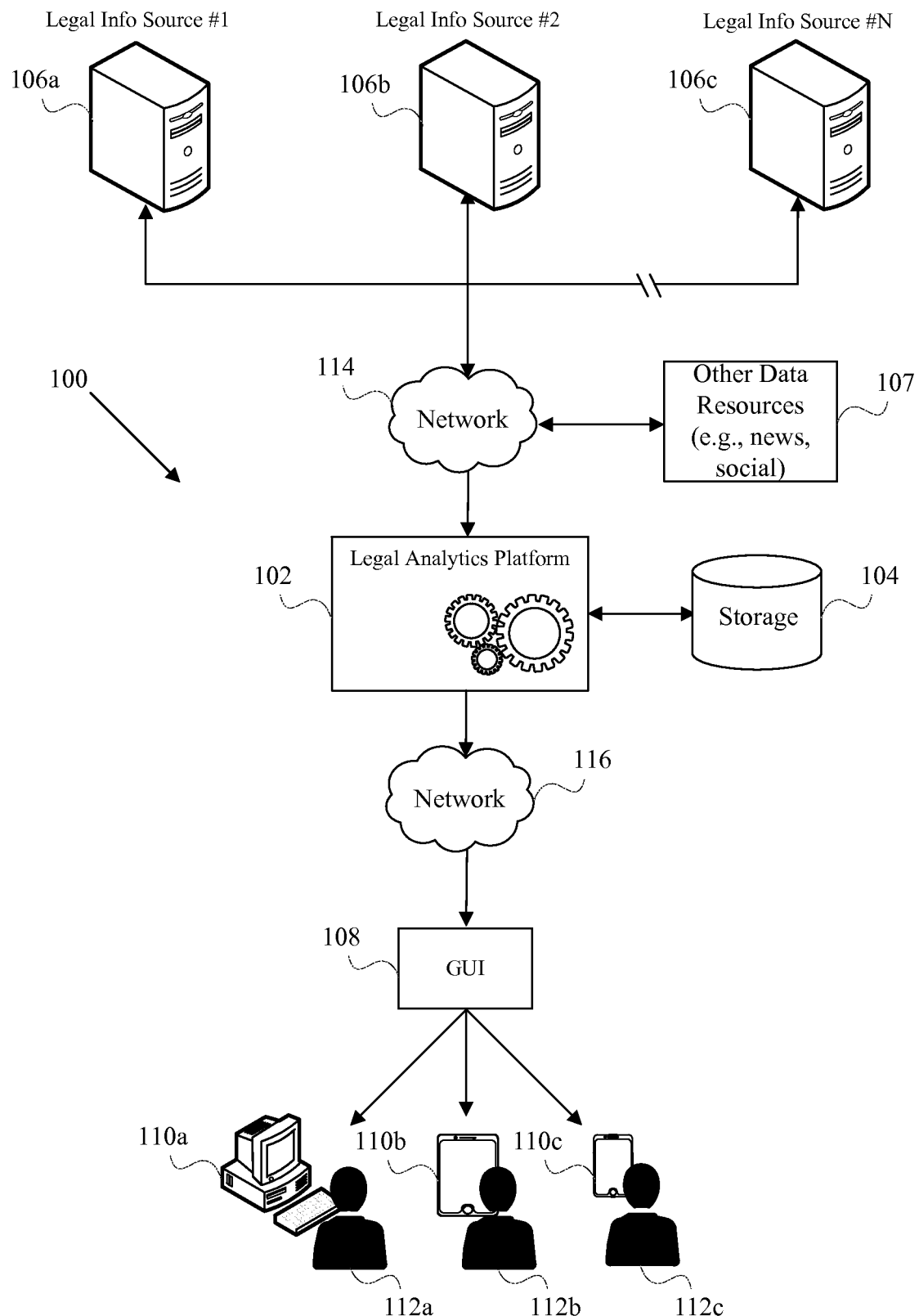
FIG. 1 is a generalized block diagram depicting certain components in a legal analytics system in accordance with various embodiments.

The figures depict various embodiments described throughout the Detailed Description for purposes of illustration only. While specific embodiments have been shown by way of example in the drawings and are described in detail below, the invention is amenable to various modifications and alternative forms. The intention, however, is not to limit the invention to the particular embodiments described. Accordingly, the claimed subject matter is intended to cover all modifications, equivalents, and alternatives falling within the scope of the invention as defined by the appended claims.

DETAILED DESCRIPTION

Various embodiments are described herein that relate to systems and methods for applying legal analytics. More specifically, various embodiments relate to electronic systems and methods for acquiring legal data and discovering meaningful patterns in the legal data.

As will be described below, legal data can be collected, or "mined," from one or more sources of legal information. The legal data can include structured elements pulled directly from the source and unstructured elements that have been extracted from the legal data. For example, the legal data may include millions of pages of electronic legal information. A legal analytics platform can process and analyze the legal data, thereby revealing insights and patterns that would have been difficult or impossible to discover using conventional research techniques. The insights and patterns can be exploited by a user (e.g., lawyer, legal practitioner, law student) to improve the likelihood of success in the practice of law. The techniques introduced herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or another electronic device) to perform a process. The machine-readable medium may include, but is not limited to, floppy diskettes, optical disks, compact disk read-only memories (CD-ROMs), magneto-optical disks, read-only memories (ROMs), random access memories (RAMs), erasable programmable read-only memories (EEPROMs), magnetic or optical cards, flash memory, or another type of media/machine-readable medium suitable for storing electronic instructions.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. The words "associate with," meanwhile, means connecting or relating objects, items, etc. For example, a piece of metadata may be associated with a particular legal entity. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware (or any combination thereof) components. Modules are typically functional components that can generate useful data or another output using specified input(s). A module may or may not be self-contained. An application program (also called an "application") may include one or more modules, or a module may include one or more application programs. "Metadata" provides information about other data and may be derived or obtained from the other data. Metadata is often composed of various individual pieces of metadata, also called "metadata elements."

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, and special significance is not to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

System Topology Overview

FIG. 1 is a generalized block diagram depicting certain components in a legal analytics system 100 in accordance with various embodiments. A legal analytics platform 102 can access and retrieve legal data from one or more sources of legal information 106a-n. The legal data, or some portion thereof, can be stored in a storage 104. In some embodiments, the legal analytics platform 102 accesses the source(s) of legal information 106a-n over a network 114 (e.g., Internet, a local area network, a wide area network, a point-to-point dial-up connection). The source(s) of legal information 106a-n can be, for example, Public Access to Court Electronic Records (PACER), Patent Application Information Retrieval (PAIR), or Electronic Document Information System (EDIS). Other network-accessible databases, such as RECAP, LexisNexis®, Westlaw®, Bloomberg Law®, and HeinOnline®, may also be accessed in certain embodiments. In some embodiments, the legal analytics platform 102 retrieves legal data from more than one source. For example, the platform 102 can access PACER to obtain legal documents and docket information for a district court case and PAIR to obtain information on any patents asserted in the case. Data may also be retrieved from other resources 107, such as news feeds, social media, conventional search engines, etc. The data can supplement any data retrieved from the source(s) of legal information 106a-c and be used to acknowledge recent events associated with a particular law firm, lawyer, judge, patent, etc. A user might review the recent events (e.g., related patent recently ruled invalid) to identify an appropriate next step in an open matter.

A user, such as users 112a-c, may interact with the legal analytics platform 102 via a GUI 108 displayed on one or more electronic devices 110a-c. The electronic devices 110a-c may be, for example, mobile phones, PDAs, tablets (e.g., iPad®), personal computers, or wearable devices (e.g., watches). Electronic devices 110a-c can present a GUI 108 for receiving user inputs, displaying results of statistical analyses, etc. In some embodiments, the electronic devices 110a-c communicate with the legal analytics platform 102 over a network 116 (e.g., Internet, a local area network, a wide area network, a point-to-point dial-up connection). Network 116 can be the same as, or different than, network 114.

In some embodiments, the legal analytics platform 102 is stored locally (e.g., as a set of machine-readable software instructions) on an electronic device, such as electronic devices 110a-c. More specifically, software for applying legal analytics can be installed and run on a user-controlled device. In such embodiments, the user may be able to specify how often data is retrieved from the source(s) of legal information 106a-n, how often legal analytics are applied, etc.

Figure 2:
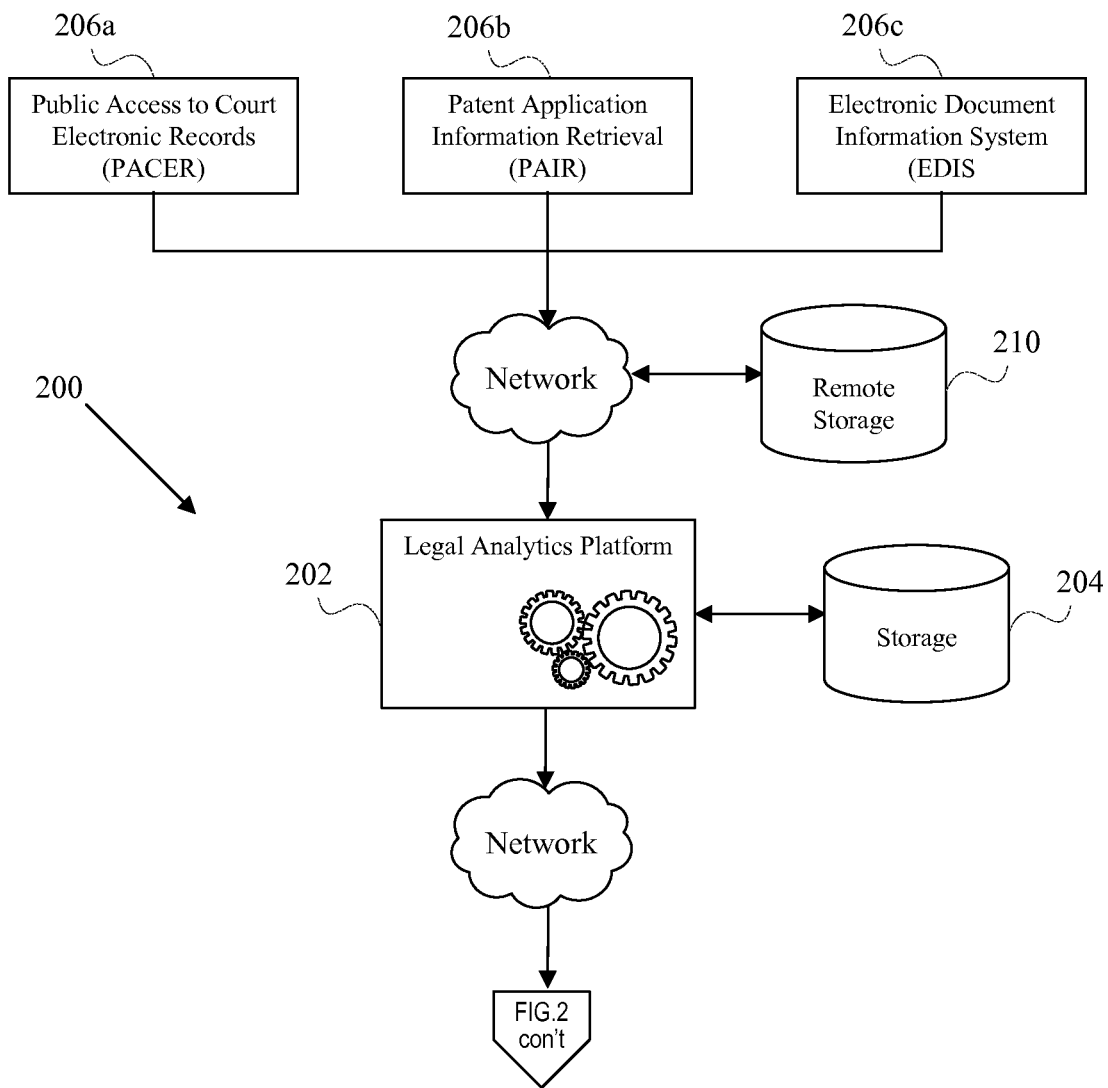
FIG. 2 is a generalized block diagram depicting components of one example of a legal analytics system.

FIG. 2 is a generalized block diagram depicting certain components of one example of a legal analytics system 200. As described above, the legal analytics platform 202 can be configured to access and retrieve legal data from one or more sources of legal information 206a-c. For example, legal analytics platform 202 of FIG. 2 is configured to access PACER, PAIR, and EDIS. Any legal data retrieved from the sources 206a-c can be stored in a storage 204. In some embodiments, the storage 204 is local with respect to the legal analytics platform 202 (e.g., legal analytics platform 202 includes one or more storage modules). In other embodiments, the legal analytics platform 202 is communicatively coupled to a remote storage 210.

After retrieving the legal data, the legal analytics platform 202 can analyze some or all of the legal data. The analysis may lead to the discovery of interesting trends, tendencies, and patterns within the legal data that can be used to improve legal decision-making. As will be described below, tendencies and patterns could be identified for particular legal entities, legal events, and derived calculations using some combination of legal entities, legal events, or both. For example, a user may wish to search for judges by their motion grant rates. In some embodiments, the legal analytics platform 202 generates a GUI 208 that allows a user to interact with the platform 202. The GUI 208 can allow the user to specify search parameters with which to search the storage 204, present search results, display textual or graphical summaries of the legal data, etc. The GUI could be presented to the user in many ways, including a web application or web-based portal, a web browser, a mobile application adapted for a cellular device, PDA, tablet, personal computer, etc. Similarly, the search results and/or summaries could be presented through email, short message service (SMS), multimedia messaging service (MMS), etc.

Figure 3:
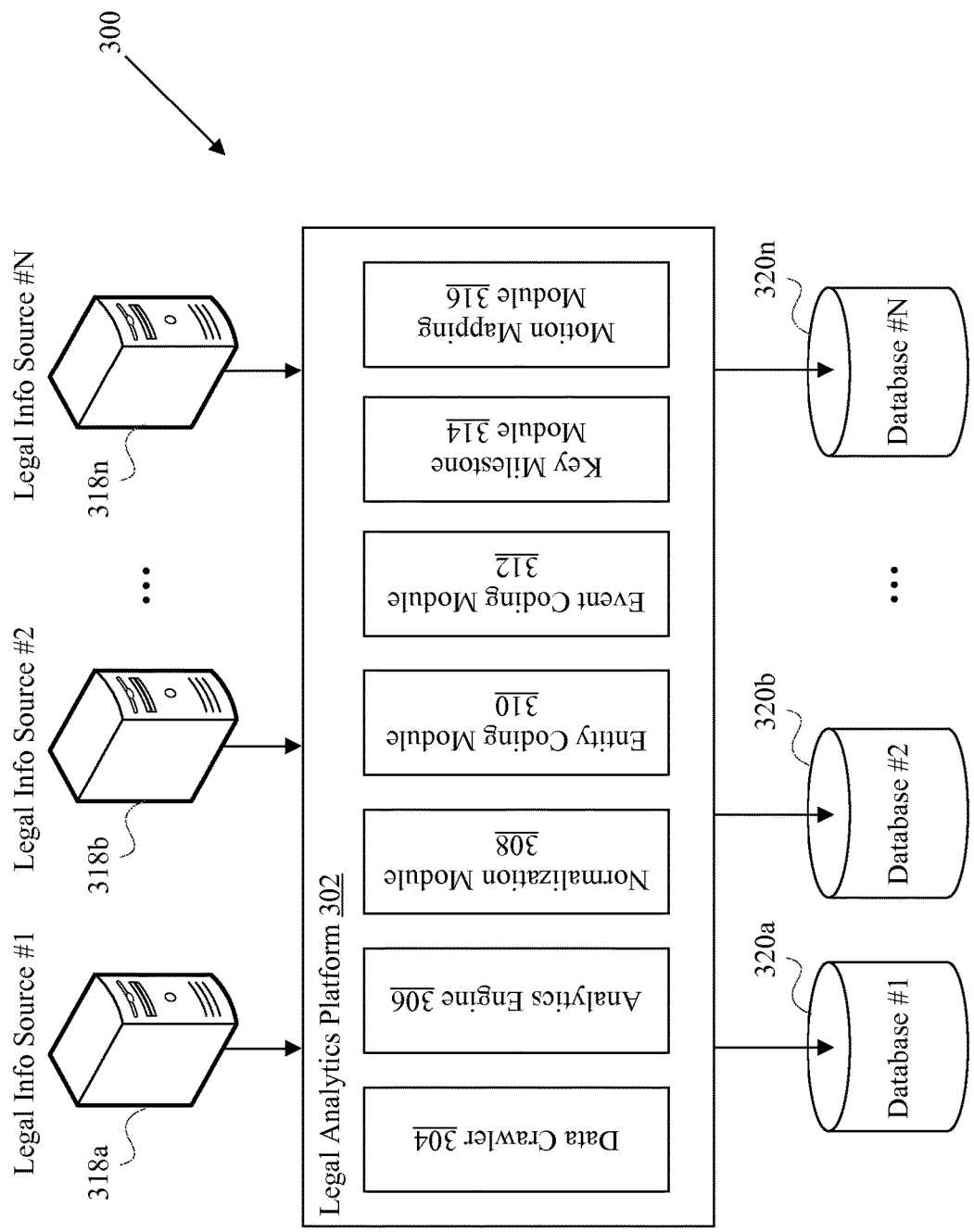
FIG. 3 is a block diagram illustrating a legal analytics system, including a legal analytics platform on which at least some operations described herein can be implemented according to various embodiments.

FIG. 3 is a block diagram illustrating a legal analytics system 300, including a legal analytics platform 302 on which at least some operations described herein can be implemented according to various embodiments. The legal analytics platform 302 can include a data crawler 304, an analytics engine 306, a normalization module 308, an entity coding module 310, an event coding module 312, a key milestone module 314, and/or a motion mapping module 316.

The data crawler 304 can be configured to access and retrieve legal data from one or more sources of legal information 318a-n. The legal data may include case and docket information, legal documents, party and participant (e.g., judge, attorney) information, dates of case events, judgments, case statuses, etc. After retrieving the legal data, an analytics engine 306 can process and analyze some or all of the legal data. More specifically, the analytics engine 306 can recognize legal constructs within the legal data that map to legal entities, legal events, or derived calculations using some combination thereof. In some embodiments, the legal data is converted into a format that is readable and searchable by the analytics engine 304. Conversion may be necessary when legal data is retrieved from sources that store legal data in different formats (e.g., HTML, PDF). The analytics engine 306 can construct one or more databases 320a-n in which some or all of the legal data is stored. For example, a database may include any legal data retrieved from a single source of legal information. As another example, a database may include all legal data of a certain type (e.g., chronology/timing information).

A normalization module 308 can be used to correct mistakes in the legal data. As will be discussed in more detail below with respect to FIGS. 4 and 8, the normalization module 308 can resolve typos (e.g., no spaces), misspellings, and/or references to an alternative name (e.g., prior law firm name), which are collectively referred to as "variants." The normalization module 308 ensures that legal data (e.g., documents, outcomes) is attributed to the proper legal entity rather than a variant. Consequently, when a user conducts a search for a particular legal entity, the user will receive all relevant legal data including any legal data originally associated with a variant of the particular legal entity.

An entity coding module 310 can generate metadata elements for legal entities identified within the legal data, identify and isolate portions of legal data that include at least one legal entity, and associate each portion with the appropriate metadata element(s). The term "legal entity" can refer to a judge, a jurisdiction, a lawyer, a law firm, a party to a lawsuit, a patent, a trademark, a copyright, etc. Similarly, an event coding module 312 can generate metadata elements for legal events, identify and isolate portions of legal data that include at least one legal event, and associate each portion with the appropriate legal event(s). The term "legal event" refers to any action or occurrence that occurs before, during, or after a case. For example, a legal event may be commencement of a trial, decision of an issue by judicial order, termination of a case, or commencement of a claim construction hearing. As another example, a legal event may be a "legal outcome," such as a case resolution (e.g., summary judgment, trial, dismissal), patent finding (e.g., infringement, invalidity, unenforceability), amount of damages, or damages type (e.g., reasonable royalties, lost profit, attorneys' fees). Consequently, the entity coding module 310 and event coding module 312 are able to tag portions of legal data, thereby signaling which legal entities and/or legal events ("metadata") are present in each portion.

A key milestone module 314 can identify timestamps in the legal data corresponding to the occurrence of a legal event. The timestamps may be extracted from, for example, docket information and case file documents. The key milestone module 314 can also generate metadata elements for legal events and tag each timestamp with the appropriate legal event(s). The key milestone module 314 is able to associate timestamps with a particular legal event. A "timestamp" is any sequence of characters or encoded information that identifies when a certain legal event occurred. For example, the legal data may include dates and times that can be used to form chronological chains of legal events. As discussed below with respect to FIGS. 18-20, a motion mapping module 316 can construct sets of electronic documents that include a motion and any subsequently-filed documents related to the motion. Each set of electronic documents constructed by the motion mapping module 316 represents a motion chain. In some embodiments, the motion mapping module 316 also generates an outcome summary that indicates whether the motion was granted or denied.

Figure 4:
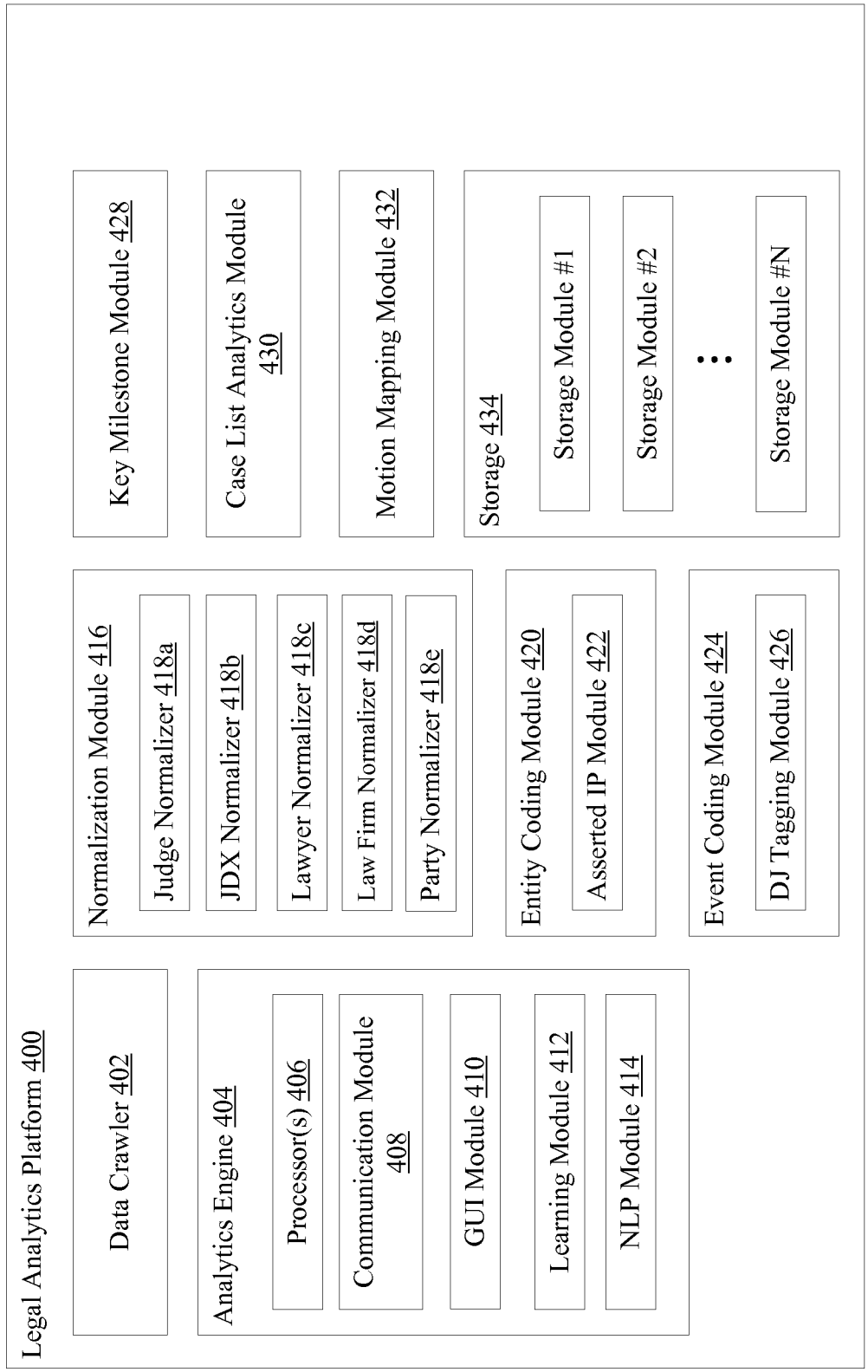
FIG. 4 is a block diagram with exemplary components of a legal analytics platform for acquiring and analyzing legal data.

FIG. 4 is a block diagram with exemplary components of a legal analytics platform 400 for acquiring and analyzing legal data. According to the embodiment shown in FIG. 4, the legal analytics platform 400 can include a data crawler 402, an analytics engine 404, a normalization module 416, an entity coding module 420, an event coding module 424, a key milestone module 428, a case list analytics module 430, a motion mapping module 432, and a storage 434, any of which may include sub-components and/or sub-modules. Other embodiments of the legal analytics platform 400 may include some, all, or none of these modules and components along with other modules, applications, and/or components. Still yet, some embodiments may incorporate two or more of these modules into a single module and/or associate a portion of the functionality of one or more of these modules with a different module.

As described above, a data crawler 402 can be configured to access and retrieve legal data from a source of legal information. The analytics engine 404 may include some combination of one or more processors 406, a communication module 408, a GUI module 410, a learning module 412, and a Natural Language Processing (NLP) module 414. The processor(s) 406 can run one or more applications or modules from instructions stored in storage 434, which can be any device or mechanism used for storing information. Communication module 408 may manage communications between components and/or other systems. For example, the communication module 408 may be used to receive legal data from a source of legal information, transmit information (e.g., results of statistical analysis) to an electronic device, etc. The legal data received by the communication module 408 can be stored in storage 434, in one or more particular modules (e.g., storage modules 434*a-n*), in a remote storage communicatively coupled to the legal analytics platform 400, or in some combination thereof.

A GUI module 410 can generate a GUI that allows a user (e.g., lawyer, legal professional, law student) to interact with the legal analytics platform 400. In some embodiments, the GUI is presented to the user by a web application or web-based portal, a web browser, a mobile application adapted for a cellular device, PDA, tablet, personal computer, etc.

Various embodiments can also employ a learning module 412 and/or an NLP module 414 that clean, code, and tag the legal data. The learning module 412 and/or NLP module 414 may be able to identify legal entities, legal events, timestamps, etc. The NLP module 414 can employ one or more word recognition processes to determine what words are present in the legal data, while the learning module 412 can add, modify, delete, etc., features from a ground truth value/set based on legal data that has previously been analyzed by the analytics engine 404. In some embodiments, the learning module 412 modifies how legal data is processed and analyzed by the analytics engine 404 based on what search results and statistical analyses the user has identified as important or useful.

As described above, a normalization module 416 can resolve mistakes in the legal data by correctly associating legal data (e.g., documents, outcomes) with the proper legal entity rather than any variants. In some embodiments, the normalization module 416 includes one or more sub-modules for normalization of a particular type of legal entity. For example, normalization module 400 includes a judge normalizer 418*a*, jurisdiction (JDX) normalizer 418*b*, lawyer normalizer 418*c*, law firm normalizer 418*d*, and party normalizer 418*e*. Various embodiments may include some, all, or none of these sub-modules and may include additional sub-modules for other entities.

The entity coding module 420 can identify portions of legal data that include one or more legal entities and tag the portions to signal which legal entities are present. In some embodiments, the entity coding module 420 includes an asserted intellectual property (IP) module 422 that is able to identify references to intellectual property (e.g., patents, trademarks, copyrights) within the legal data. The entity coding module 420 can identify portions of legal data in which intellectual property is referenced. More specifically, the asserted IP module 422 can generate metadata elements for each asserted piece of intellectual property, identify portions of legal data in which intellectual property is introduced or described, and associate the portions with the appropriate metadata element. For example, a case opinion that describes two patents can be associated with two distinct metadata elements. These metadata elements, as well as others, constitute the metadata used to describe the legal data. Markers may be used to indicate where each of the patents are mentioned within the case opinion. The asserted IP module 422 can be configured to identify patents, trademarks, copyrights, or any combination thereof.

The event coding module 424 can tag portions of legal data to signal what legal events, if any, are present within the legal data. For example, the event coding module 424 may be able to determine a patent has been ruled invalid based on the recognized content of a case opinion. In some embodiments, the event coding module 424 includes one or more sub-modules configured to identify particular legal outcomes (e.g., DJ Tagging Module 426 to identify declaratory judgments). The legal analytics platform 400 can also include a key milestone module 428 and/or a motion mapping module 432, as described above with respect to FIG. 3.

The case list analytics module 430 allows the user to select cases using specific criteria, such as case type, date range, jurisdiction, judge, case resolution, damages, and patent finding. A case list analytics module 430 can collect legal data (e.g., from storage 434) associated with one or more cases specified by a user and identify meaningful statistics and patterns within the one or more cases. The analytics engine 404 can then execute a variety of statistical analysis functions to identify interesting information and trends in the cases. The case list analytics module 430 and analytics engine 404 allow the user to receive information without having to analyze each case within a case list individually.

Legal Analytics Based on Legal Entity

Figure 5:
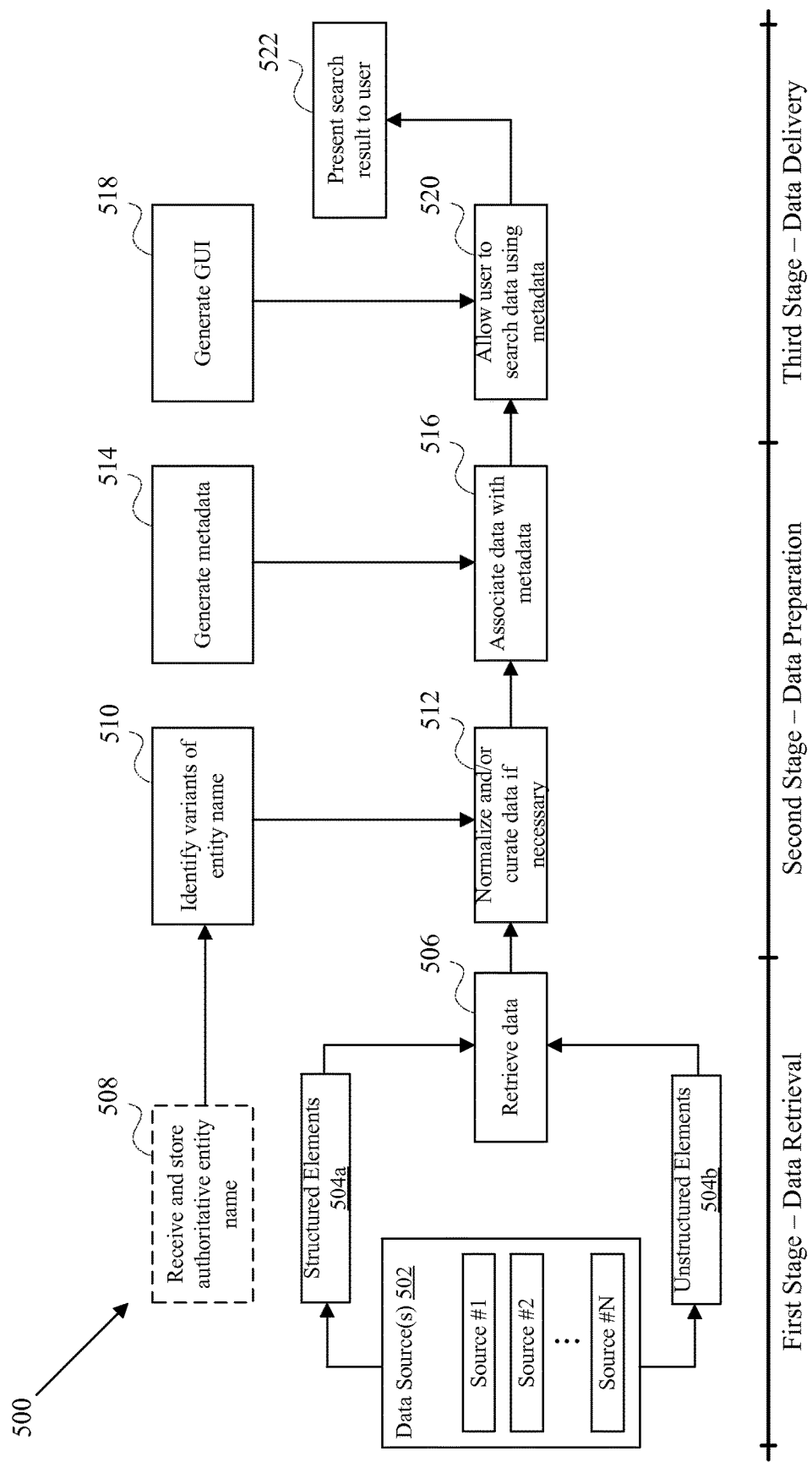
FIG. 5 is a flow diagram illustrating an overview of a process for retrieving, preparing, and delivering legal data according to various embodiments.

FIG. 5 is a flow diagram illustrating an overview of a process 500 for retrieving, preparing, and delivering legal data according to various embodiments. At block 506, a legal analytics platform retrieves (e.g., using data crawler 402 of FIG. 4) legal data from one or more data sources 502. The data source(s) 502 may be electronic databases, such as PACER, PAIR, and EDIS. In some embodiments, the legal analytics platform retrieves structured elements 504*a* pulled directly from the source (e.g., docket information, dates) and extracts unstructured elements 504*b* that are embedded within the legal data (e.g., electronic documents).

As will be discussed below with respect to FIG. 9, normalizing is generally a multi-step process. At block 508, the legal analytics platform can receive and store an authoritative entity name that is known to be correct. The authoritative entity name may be provided by an administrator (e.g., individual, computing system). While authoritative names may improve the effectiveness of normalization, they are not necessarily required. At block 510, the legal analytics platform identifies variants of an entity name. The variants generally include typos (e.g., no spaces), misspellings, or references to an alternative name (e.g., prior law firm name). In some instances the authoritative entity name is used to identify variants, while in other instances the legal analytics platform combines similar entities (i.e., names) into a single category. At block 512, the structured elements 504*a* and/or unstructured elements 504*b* can be normalized, if necessary, to correct mistakes.

At block 514, the legal analytics platform generates metadata that identifies the presence of various legal entities. For example, pieces or elements of metadata may correspond to individual judges, jurisdictions, lawyers, law firms, parties to various lawsuits, patents, trademarks, copyrights, etc., identified in the legal data. At block 516, the legal analytics platform associates portions of the legal data with the metadata elements to signal what legal entities are present. A portion of legal data could be associated with multiple legal entities. For example, an electronic legal document may be associated with a particular judge and a particular law firm. Consequently, a user could specify a combination of legal entities when searching the legal data or filtering search results.

At block 518, the legal analytics platform generates a GUI that can be presented to the user. At block 520, the user is able to search the legal data by specifying search parameters that include one or more metadata elements (e.g., specifying one or more legal entities). For example, the user can search for legal data associated with a particular judge, jurisdiction, or law firm. The search can be tailored by the user to identify particularly relevant insights. At block 522, the legal analytics platform presents a search result to the user via the GUI. The search result can include legal data, selectable hyperlinks to the legal data, a textual summary, a graphical summary (e.g., a chart), etc. The user may elect to filter the search results by adding and/or removing metadata elements from the search parameters.

In some embodiments, the process 500, or a subset of steps (e.g., retrieving data 506), is periodic in nature. For example, the legal analytics platform can be configured to retrieve data from the data source(s) 502 hourly, daily, etc. Similarly, the legal analytics platform can be configured to apply legal analytics hourly, daily, etc., or whenever a user inputs a request. In some embodiments, the legal analytics platform retrieves data from distinct sources on distinct schedules. That is, the platform may retrieve data from a first data source hourly and retrieve data from a second data source daily.

Figure 6:
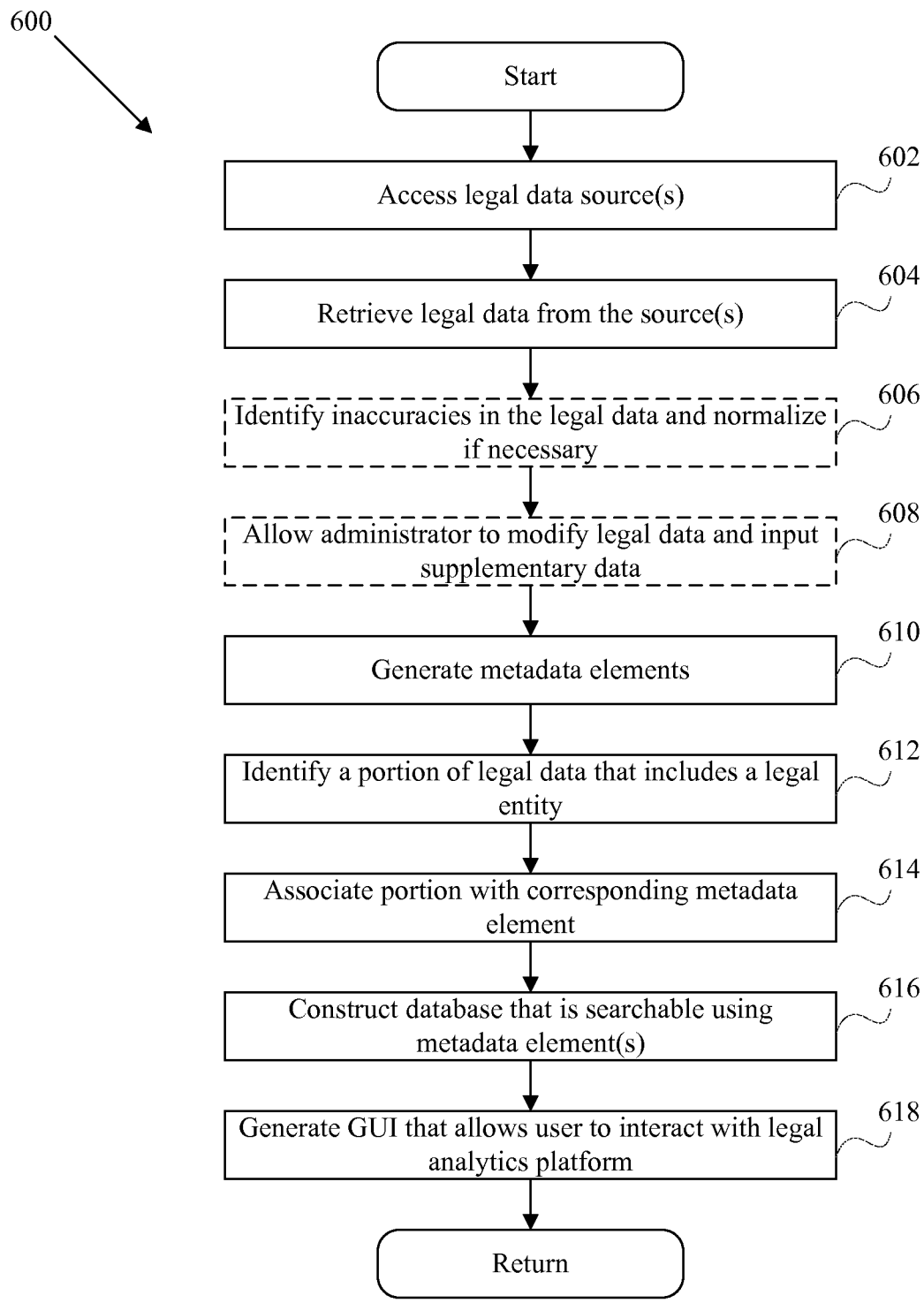
FIG. 6 is a flow diagram depicting general steps in a legal analytics process as may occur in some embodiments.

FIG. 6 is a flow diagram depicting general steps in a legal analytics process 600 as may occur in some embodiments. At block 602, a legal analytics platform accesses one or more sources of legal information (e.g., sources 106*a-n* of FIG. 1). The sources of legal information can be any network-accessible legal database, such as PACER, PAIR, EDIS, RECAP, LexisNexis®, Westlaw®, Bloomberg Law®, HeinOnline®, etc. At block 604, the legal analytics platform retrieves legal data from at least one of the sources of legal information.

In some embodiments, the legal analytics platform is configured to identify inaccuracies in the legal data and, if necessary, normalize the inaccuracies as shown at block 606. The normalization process is described below with respect to FIG. 8. In some embodiments, the legal analytics platform allows an administrator to modify any legal data previously retrieved from source(s) of legal information and input supplementary legal data. For example, an administrator can manually modify aspects of the legal data by changing text that was incorrectly recognized during an OCR/word recognition process and can manually input supplementary legal data by adding a legal outcome for which no metadata element has been generated.

At block 610, the legal analytics platform can generate metadata elements that represent various legal entities. The metadata elements, which collectively form metadata, support entity-based searching. However, as will be discussed below, metadata elements may also be generated for other legal constructs, such as legal events. The metadata elements generated at block 610 in the present embodiment represent distinct legal entities. For example, each judge at the U.S. District Court for the Northern District of California (N.D.Cal.) can be associated with an identifying metadata element that distinguishes him or her from all other judges. As another example, an identifying metadata element may be generated for each law firm that has tried a case in N.D.Cal. In some embodiments, the metadata elements are assembled into sets (e.g., judges) and subsets (e.g., judges at the N.D.Cal.) that can be used to formulate search parameters, At block 612, the legal analytics platform can identify portions of legal data that include at least one legal entity. For example, a portion of legal data (e.g., an electronic legal document) may include references to a judge, a jurisdiction, a law firm, etc.

At block 614, the legal analytics platform can associate each portion with at least one of the metadata elements, thereby identifying what legal entities are present. A portion may be associated with multiple metadata elements in some instances. The multiple elements can be of the same kind (e.g., multiple legal entities) or of different kinds (e.g., a legal entity and a legal event). At block 616, the legal analytics platform can construct a database that includes some or all of the legal data and is searchable using the metadata elements (i.e., by legal entity). In some embodiments, a user is able to specify one or more elements that are used to search the metadata in the database. For example, the user may designate combinations such as judge/judge, jurisdiction/judge, judge/law firm, etc. One skilled in the art will recognize that any combination of legal entities could be used to search the database. At block 618, the legal analytics platform can generate a GUI that allows a user to interact with the platform, search the database of legal data, and review search results, as will be discussed below with respect to FIG. 7.

Figure 7:
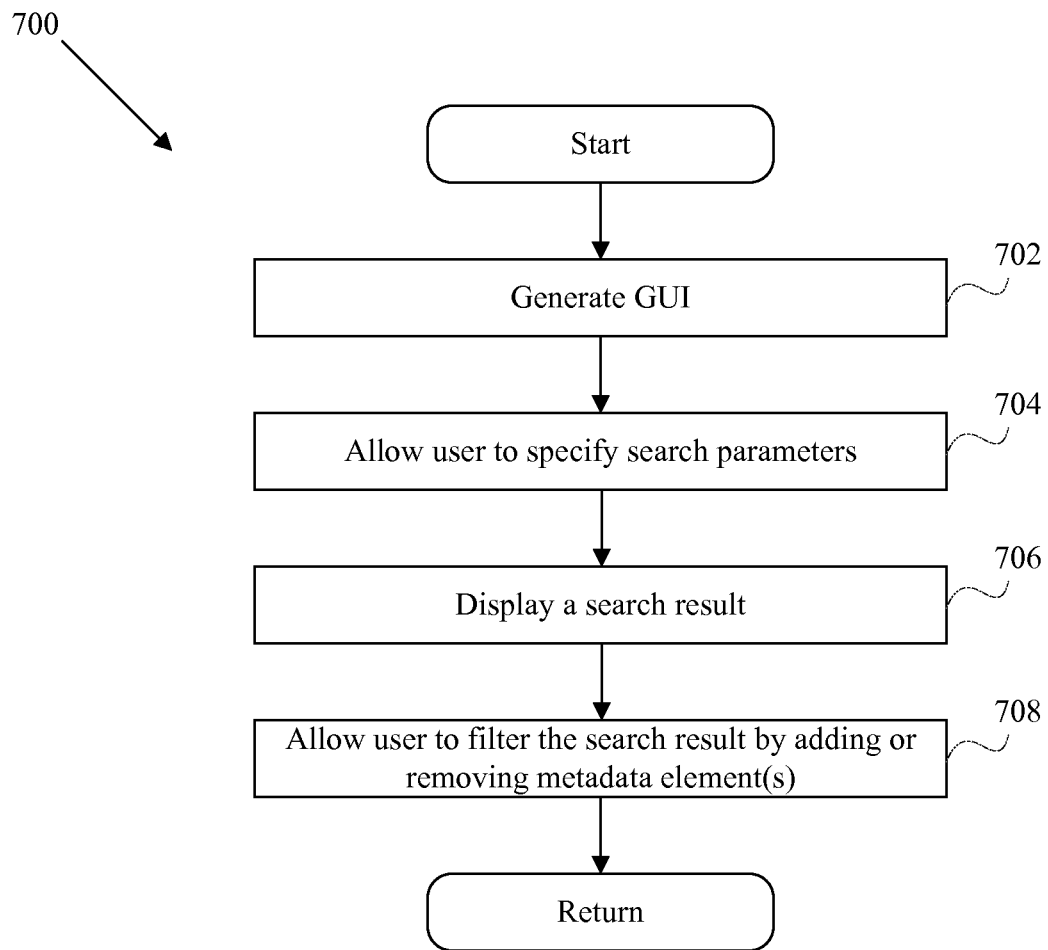
FIG. 7 is a flow diagram depicting various steps in a process for generating and implementing a GUI according to various embodiments.

FIG. 7 is a flow diagram depicting various steps in a process 700 for generating and implementing a GUI according to various embodiments. At block 702, the legal analytics platform (e.g., via GUI module 410 of FIG. 4) generates a GUI. In some embodiments, the GUI is interactive and is configured to update in real-time in response to a user input. The GUI can be configured to be presented by a web application or web-based portal, web browser, or a mobile application adapted for a wearable device, cellular device, PDA, tablet, personal computer, etc. Moreover, the GUI could be presented using more than one layout. For example, a full version/layout for web browsers, tablets, personal computers, etc., and a mobile version/layout for cellular devices, PDAs, etc.

At block 704, the GUI can allow a user to specify search parameters with which to search the database. The search parameters include one or more metadata elements that are used to search the metadata and identify relevant legal data. As described above, in some instances the user may specify combinations of metadata elements (e.g., judge/jurisdiction) to further clarify what legal data is relevant and narrow the search. When specifying the search parameters, the user may be able to select pre-existing metadata elements (e.g., from a list) or manually input (e.g., type) data used to match or look up corresponding metadata elements (e.g., a party's name). While "searching" and "search parameters" may be used throughout the Detailed Description, the systems and processes described herein apply equally to browsing a legal database. That is, a user may identify relevant documents or legal information by browsing through a legal database organized by category (e.g., narrowing from "Courts" to "N.D.Cal." to "Patent Cases").

At block 706, the GUI can display a search result to the user. The search result may include legal data, selectable hyperlinks to legal data, a textual summary, a graphical summary (e.g., a chart), etc. For example, the search result may include a textual summary 904 and a graphical summary 902, as shown in FIG. 9, for a portion or subset of legal data specified by the user. At block 708, the GUI can allow the user to filter the search result by modifying the search parameters. A user can modify the search parameters by adding or removing metadata elements. The metadata elements can be designated as inclusive or exclusive when searching or filtering. In other words, a user can designate an element (e.g., N.D.Cal.) as being included in the search parameters (i.e., search result includes legal data tagged as "N.D.Cal.") or excluded from the search parameters (i.e., search result does not include legal data tagged as "N.D.Cal.," even if the legal data matches other search terms). The user's ability to include and exclude metadata elements affords significant flexibility in determining appropriate search parameters. For example, if a case search included "N.D.Cal," "C.D.Cal." and "S.D.Cal.," and excluded "Patent Cases," the search result would include all cases in those jurisdictions that are not tagged as patent cases.

Figure 8:
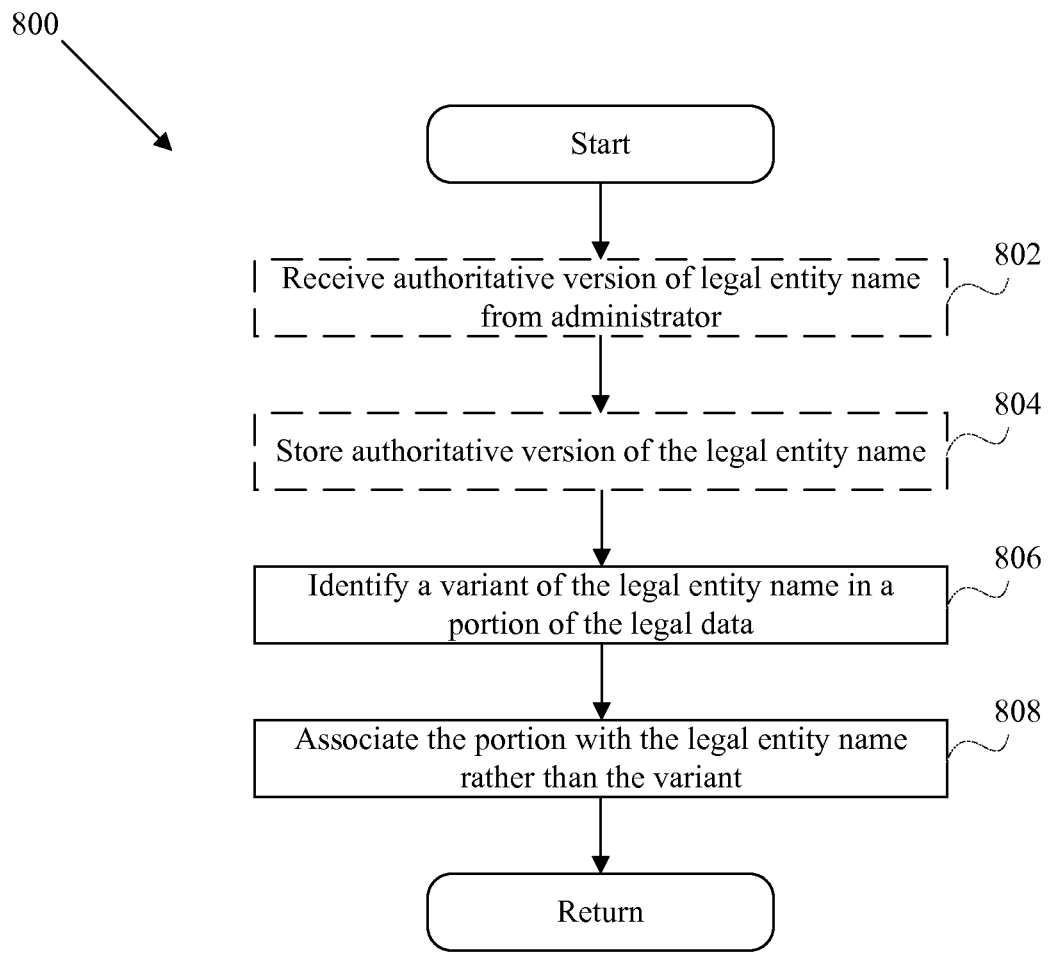
FIG. 8 is a flow diagram depicting various steps in an entity normalization and curation process as may occur in some embodiments.

FIG. 8 is a flow diagram depicting various steps in an entity normalization and curation process 800 as may occur in some embodiments. At block 802, the legal analytics platform may receive an authoritative version of a legal entity name from an administrator that is known to be correct. At block 804, legal analytics platform may store the authoritative legal entity name (e.g., in storage 434 of FIG. 4). Once stored, the authoritative legal entity name can be treated as the ground truth value by a normalization module (e.g., normalization module 416 of FIG. 4) that determines whether variants of the authoritative legal entity name exist in the legal data. However, as described above, the authoritative legal entity name may not be provided in some embodiments. At block 806, the legal analytics platform identifies a variant of the authoritative legal entity name in a portion of the legal data. The variant may be a typo, a misspelling, an outdated or alternative entity name, etc. Once the variant is identified, the portion of legal data including the variant can be isolated for further processing. In those embodiments in which an authoritative version of the legal entity name is not provided, the legal analytics platform can identify similar entity names and combine those similar entity names into a single category. At block 808, the legal analytics platform remedies the mistake by associating the portion with the authoritative legal entity name or single category rather than the variant. The normalization process 800 ensures legal data (e.g., documents, outcomes) is correctly attributed to the proper legal entity, rather than a variant. In some embodiments, a machine learning module (e.g., learning module 412 of FIG. 4) is able to improve future normalization by updating the ground truth value or storing common variants upon receiving an affirmation from a user or an administrator that a previous variant characterization was correct.

Although FIGS. 7 and 8 are largely described in the context of legal entities, these concepts could also be employed in systems and processes for recognizing and identifying legal events, chronology and time, etc.

Figure 9:
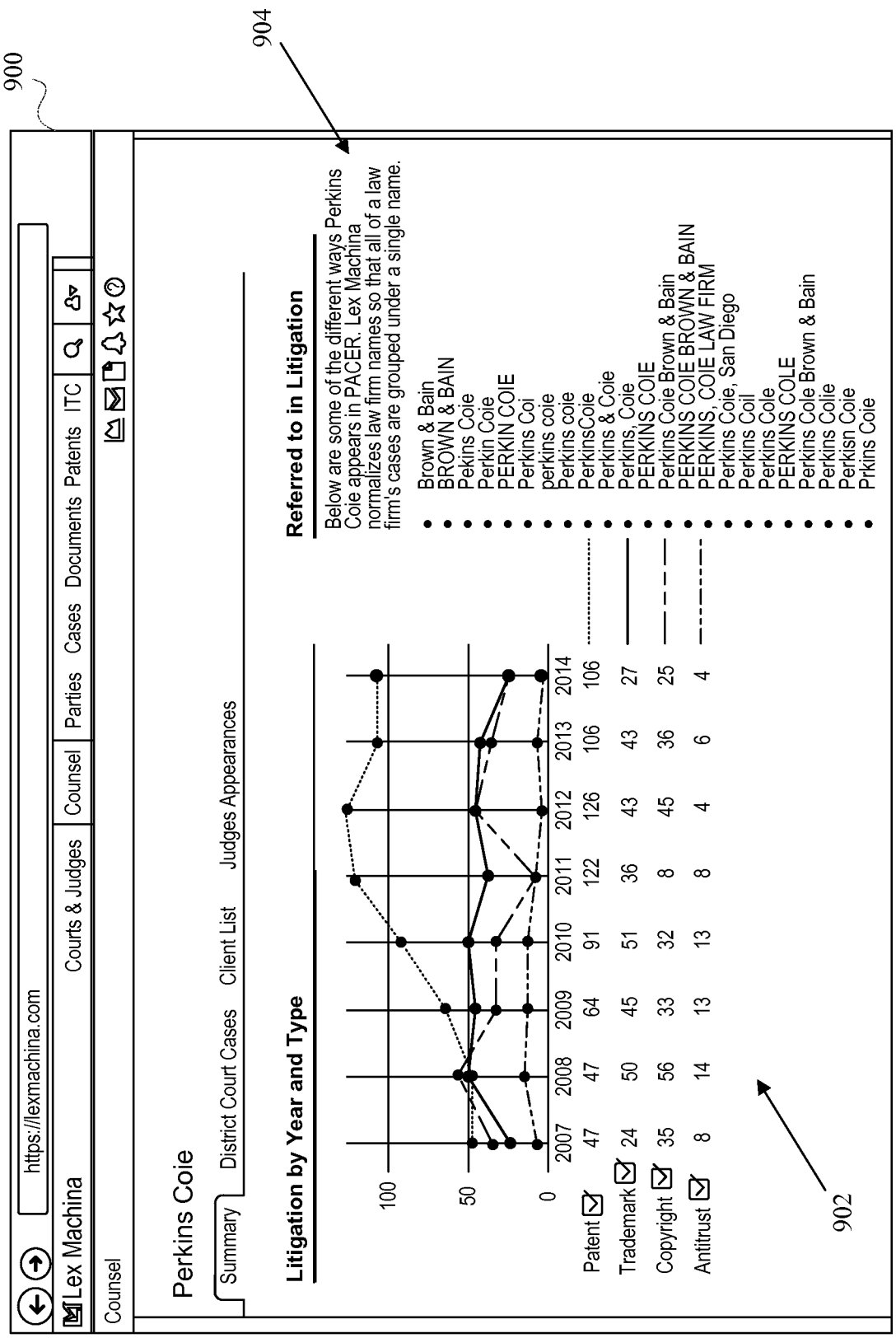
Figure 10:
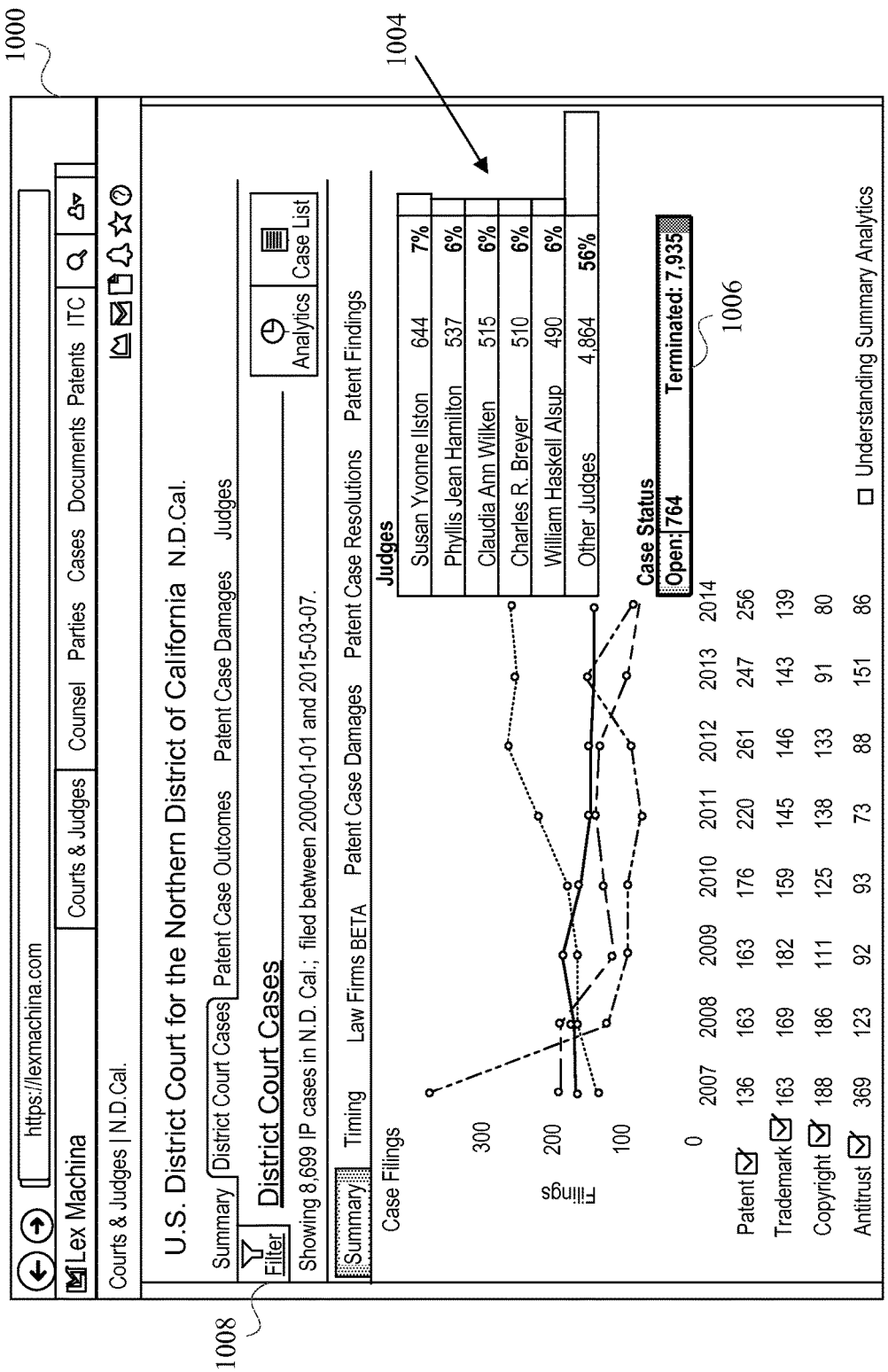
Figure 11:
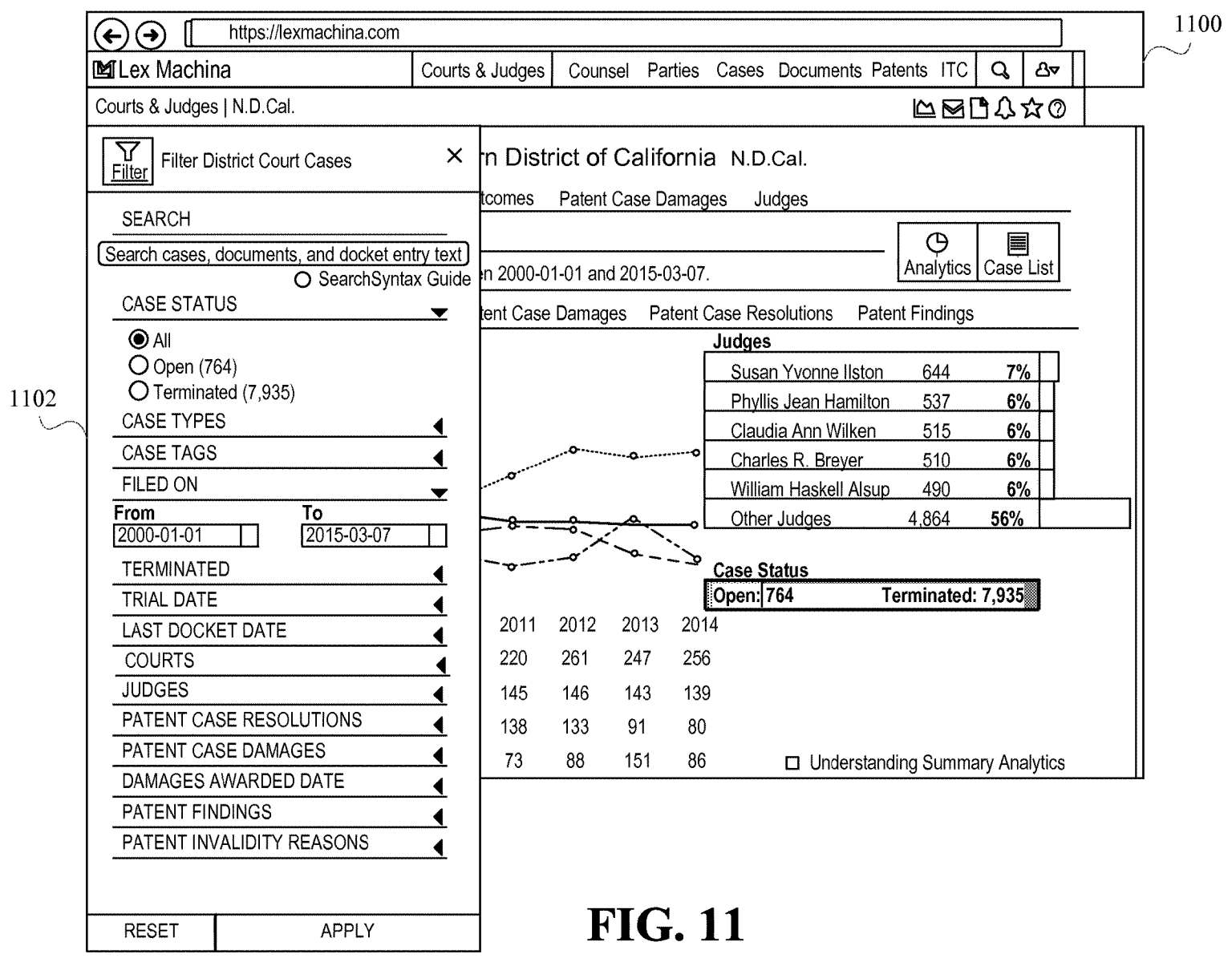

FIGS. 9, 10, and 11 are screenshots of GUIs 900, 1000, 1100 in accordance with various embodiments. As illustrated by FIG. 9, the GUI 900 can include both textual and graphical features. For example, GUI 900 displays a summary page for a particular legal entity selected by a user. The GUI 900 includes a textual summary 904 of variants identified during the normalization process and a graphical summary 902 of legal data associated with the particular legal entity. In the present embodiment, the graphical summary 902 includes a line chart showing case distribution by case type (e.g., patent, trademark, copyright, antitrust) over time.

As illustrated by FIG. 10, a GUI 1000 can present results of various statistical analyses of legal data. GUI 1000, which presents a summary page for "N.D.Cal.," as selected by a user, includes a line chart 1002 showing distribution by case type over time, a bar chart 1004 showing distribution by judge, and a stacked column chart 1006 showing distribution by case status. However, any form of textual or graphical representation could be used, including tables, lists, histograms, bar charts, pie charts, line charts, doughnut charts, bubble charts, etc. Analytical processes can be applied to any set or subset of the legal data. For example, statistical analysis could be performed on legal data associated with a jurisdiction, judge, combination of judges, etc. GUI 1000 also includes a filter button 1008 that allows the user to modify what legal data is analyzed.

When the user selects the filter button 1008, a filter menu 1102 may appear as shown in FIG. 11. The filter menu 1102 allows the user to modify what legal data is analyzed. Generally, a user will the filter menu 1102 to specify or modify search parameters by adding or removing metadata elements used to search the legal data. Search parameters may include any combination of legal entities (e.g., courts, judges, parties), legal events (e.g., resolution, date of filing, termination, trial, damages), etc. As described above, the search parameters can designate elements as being inclusive or exclusive when searching or filtering. Some example elements are listed in Table 1, although this list is not exhaustive. Other elements are also possible, such as a subgroup of elements for different procedural case resolutions, expert witnesses, technology industry codes, legal industry codes (e.g., Nice Agreement international trademark classes, USPTO art classes), non-practicing entities, etc.

TABLE 1

Example Metadata Elements

| Legal Data Subsets | Sample Metadata Element Options |
|---|---|
| Case Status | All; Open; Terminated |
| Case Types | All; Patent; Trademark; Copyright; Antitrust |
| Case Tags | All; ANDA; Declaratory Judgment; Appeal; Claim Construction Hearing; Trial; Jury Trial; Bench Trial |
| Filed On | Selectable range of dates |
| Terminated | Selectable range of dates |
| Trial Date | Selectable range of dates |
| Last Docket Date | Selectable range of dates |
| Courts | All U.S. district courts |
| Judges | All U.S. district judges |
| Case Resolutions | All; Likely Settlement; Procedural; Claimant Win; Claim Defendant Win |
| Case Damages | All; Costs; Attorneys' Fees; Other/Mixed Damage Types; Statutory Damages - Willful (Copyright); Statutory Damages (Copyright); Statutory Damages - Willful (Trademark); Statutory Damages (Trademark); Prejudgment Interest; Reasonable Royalty; Trademark Owners' Actual Damages; Infringer's Profits; Actual Damages & Infringer's Profits; Lost Profits; Corrective Advertising; Public Performance License (§504d) |
| Damages Awarded Date | Selectable range of dates. |
| Patent Findings | All; Infringement; Non-Infringement; Invalidity; No Invalidity; Unenforceability; No Unenforceability |
| Patent Invalidity Reasons | All; 101 Subject Matter; 102 Anticipation/Novelty; 102(f) Derivation (pre-AIA); 102(g) Interference (pre-AIA); 103 Obviousness; 112 Written Description; 112 Enablement; 112 Definiteness; 112 Best Mode (pre-AIA); 171 Improper Design Patent; 133, 371 Application Abandonment; 132, 251, 255, 305 Defective Correction; Obviousness-Type Double Patenting; No Invalidity Reason Specified |
| Remedies | Permanent Injunction; Preliminary Injunction; Seizure of Goods; Temporary Restraining Order; Relinquish Domain Name; Termination of Mark |

Legal Analytics Based on Legal Event

Figure 12:
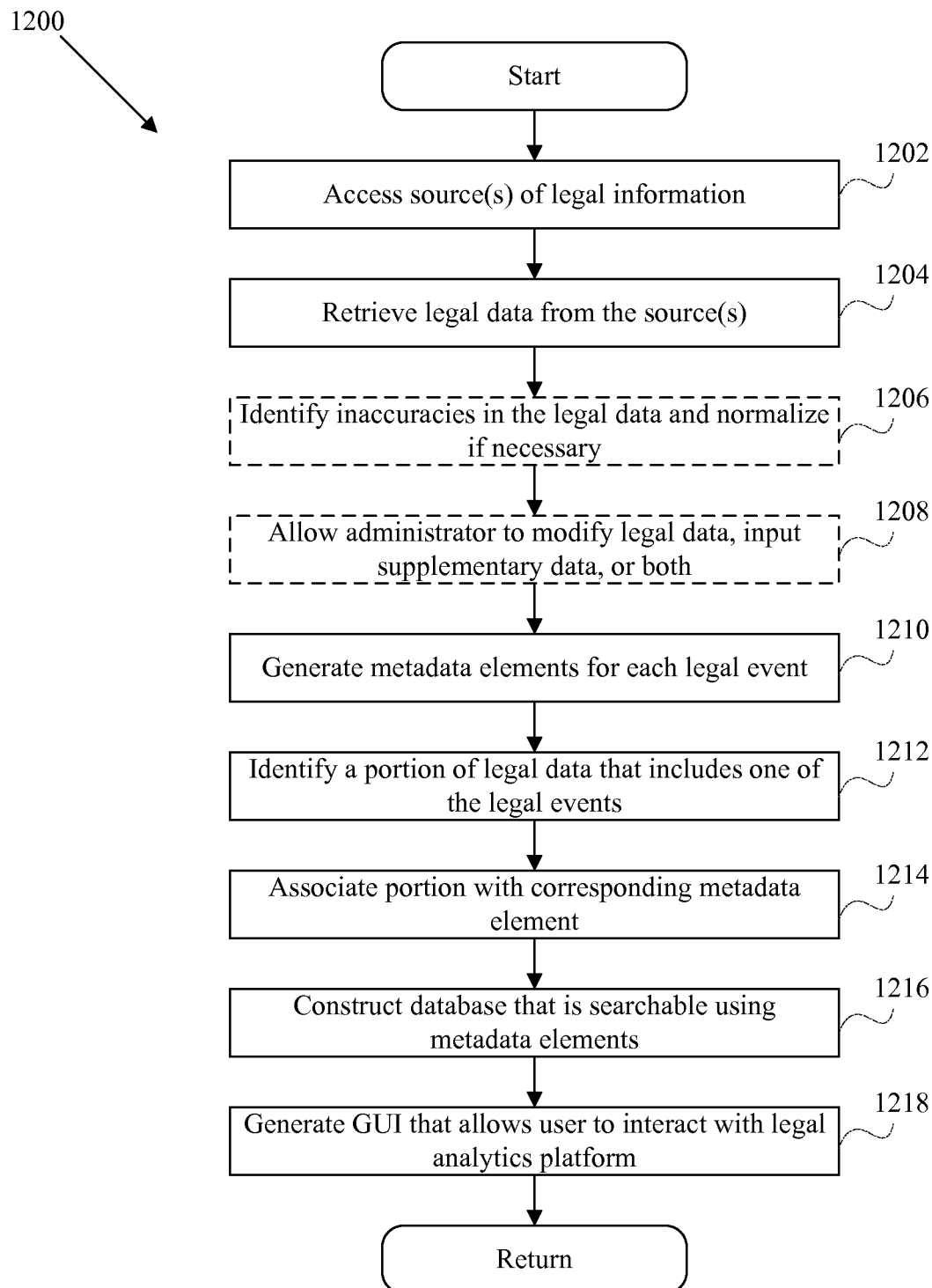
FIG. 12 is a flow diagram depicting general steps in a legal analytics process as may occur in some embodiments.

FIG. 12 is a flow diagram depicting general steps in a legal analytics process 1200 as may occur in some embodiments. The process 1200 for analyzing legal events may be largely similar to process 600 of FIG. 6 for analyzing legal entities. At block 1202, a legal analytics platform accesses one or more sources of legal information, such as PACER, PAIR, or EDIS. At block 1204, the legal analytics platform can retrieve legal data from at least one of the sources.

In some embodiments, the legal analytics platform is configured to identify and cure inaccuracies in the legal data, shown at block 1206, and/or allow an administrator to modify the legal data and input supplementary legal data, shown at block 1208. Various embodiments may include both, one, or neither of these steps. Further details regarding the normalization process are described above with respect to FIG. 8.

At block 1210, the legal analytics platform can generate metadata elements that represent various legal events present in the legal data. Together, the various metadata elements constitute metadata that is associated with the legal data. The legal events may include, for example, case resolutions (e.g., likely settlement, procedural, claimant win), damages types (e.g., compensatory lump, attorneys' fees), amounts of damages, patent findings (e.g., infringement, invalidity), etc. In some embodiments, subgroups of elements are generated. For example, a subgroup of elements under "Procedural" may include "Interdistrict Transfer," "Stay," "Consolidation," and "Dismissal." The subgroups allow a user to identify a more specific segment of legal data on which analytics are to be applied. As another example, a subgroup of elements under "Invalidity" may include "101 Subject Matter," "102 Anticipation/Novelty," and "103 Obviousness." At block 1212, the legal analytics platform can identify portions of legal data that include at least one legal event.

At block 1214, the legal analytics platform can associate each identified portion with at least one element, thereby identifying what legal event is present. An identified portion may be associated with multiple elements in some instances (e.g., a damage type and a damage amount, infringement and no invalidity). At block 1216, the legal analytics platform can construct a database that includes some or all of the legal data and the metadata, and is searchable by metadata element. For example, the user may designate a single metadata element, such as Invalidity, or combinations of elements, such as Invalidity/Non-Infringement or Compensatory Lump Damages/Attorneys' Fees. Any combination of legal events may be used to search the database. As described above, the elements can be designated as inclusive or exclusive when searching or filtering. At block 1218, the legal analytics platform can generate a GUI that allows a user to interact with the platform, search the database of legal data, review results of statistical analysis, etc.

Figure 13:
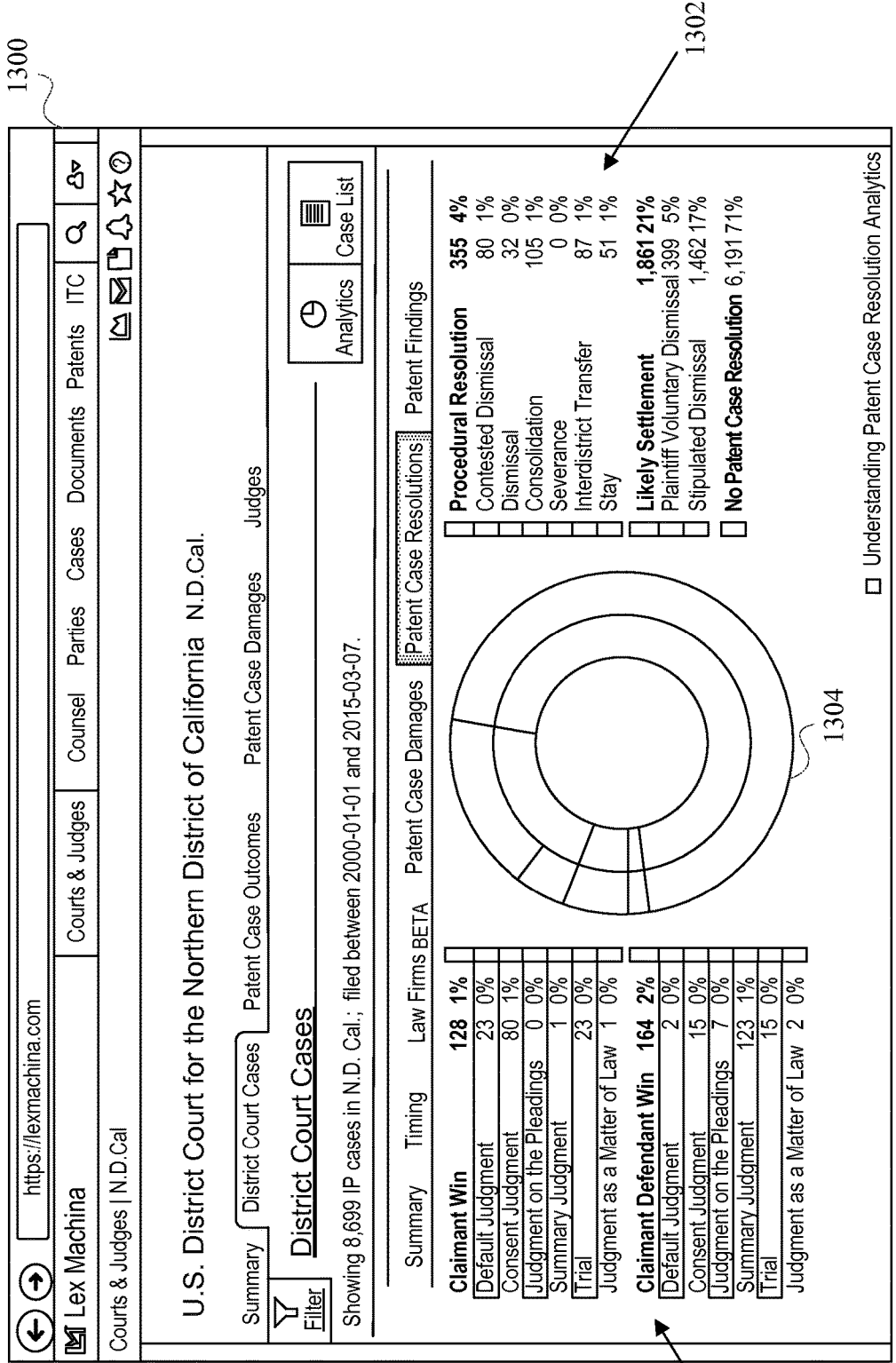
FIGS. 13, 14, and 15 are screenshots of GUIs in accordance with various embodiments.
Figure 14:
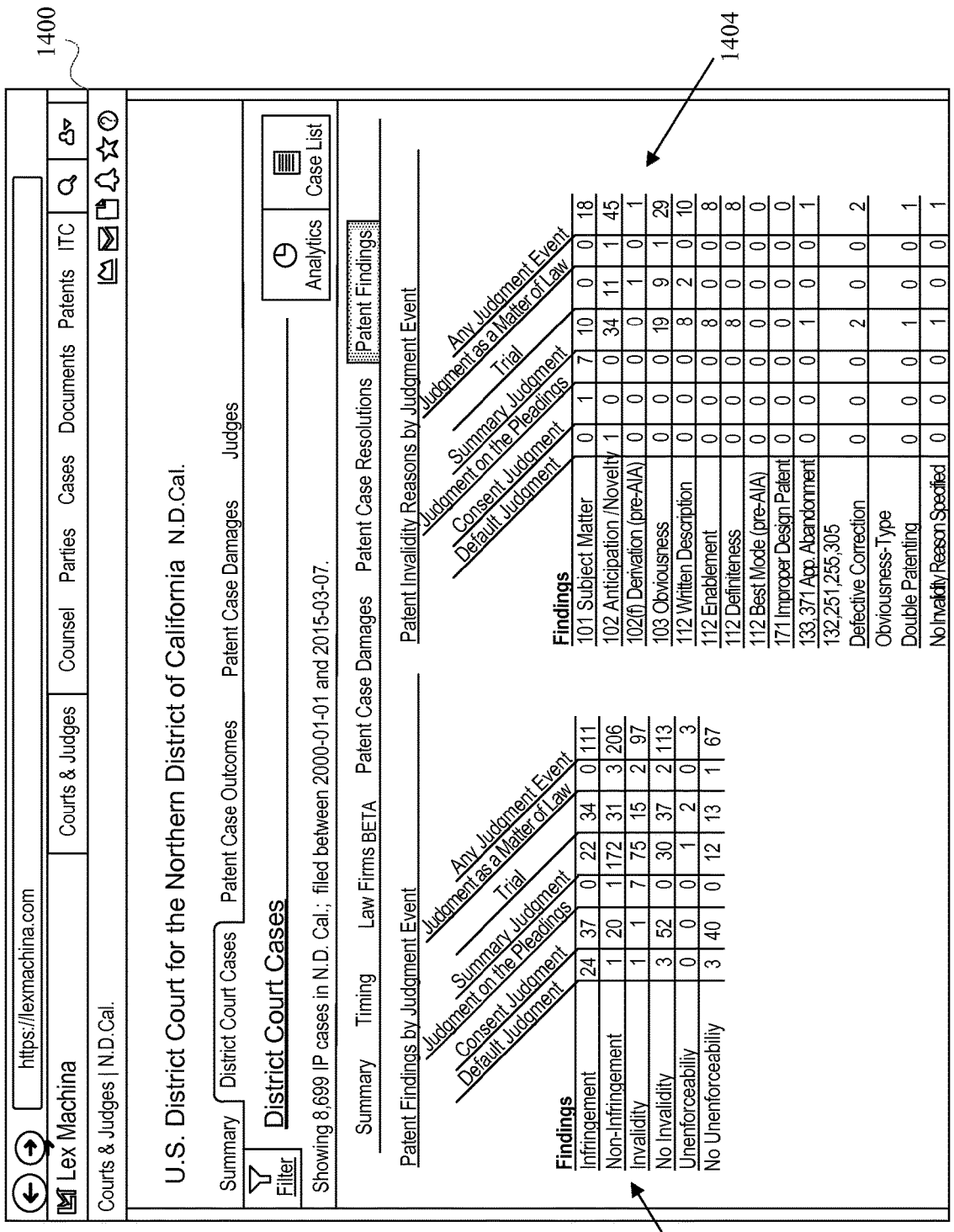
Figure 15:
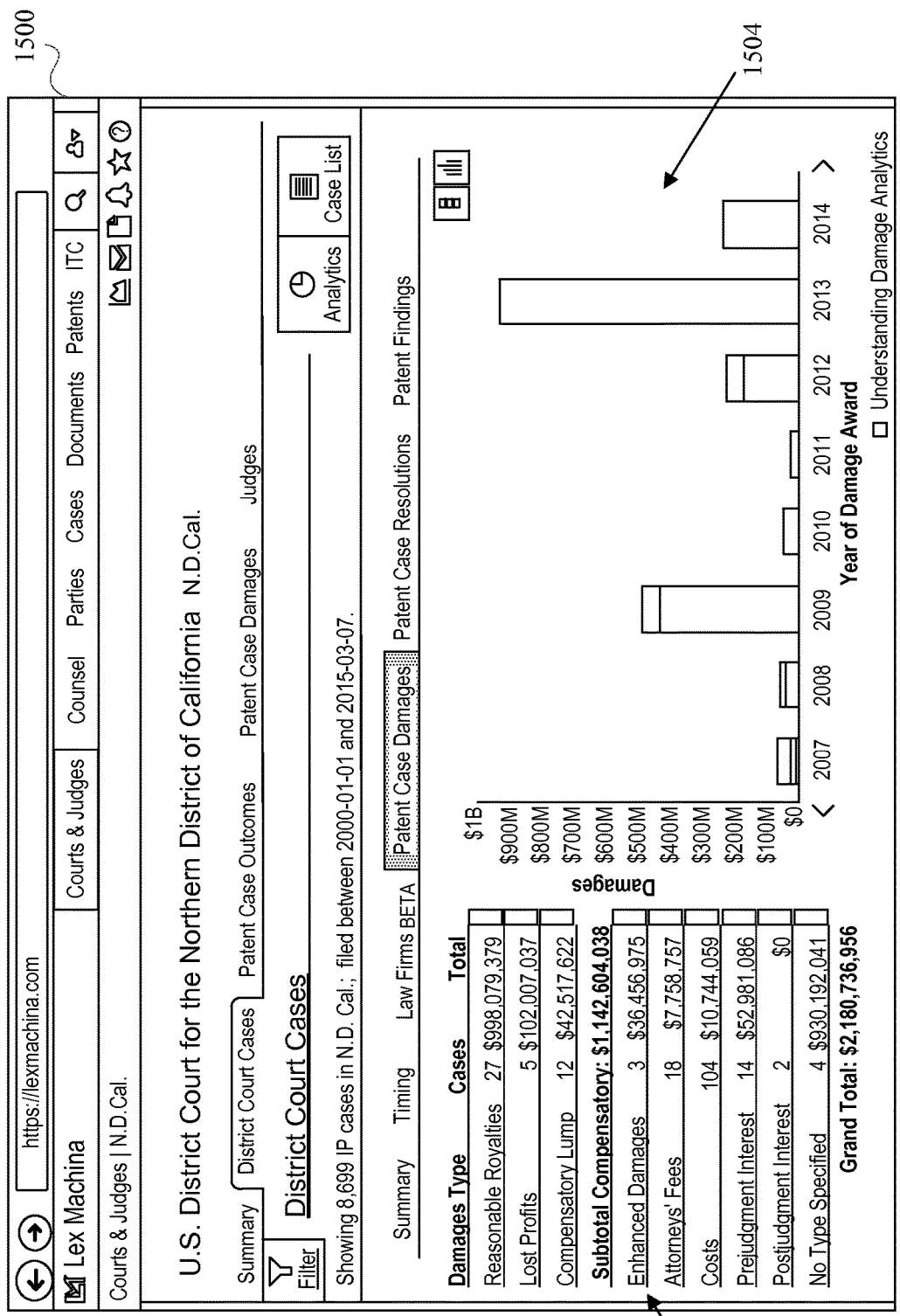

FIGS. 13, 14, and 15 are screenshots of GUIs 1300, 1400, 1500 in accordance with various embodiments. As illustrated by FIG. 13, the GUI 1300 can include a table 1302 and a chart 1304 that summarize any statistical analyses performed on the relevant legal data. For example, both table 1302 and chart 1304 show case distribution by resolution type for a legal entity ("N.D.Cal.") selected by a user. In some embodiments, hovering over or selecting a segment of the chart causes an entry in the table corresponding to the segment to become highlighted (e.g., row is outlined, bolded, intensified).

A GUI 1400 may present search results or results of statistical analysis using one or more tables. For example, GUI 1400 of FIG. 14 includes tabular summaries of patent findings 1402 and patent invalidity reasons 1404. The tabular summaries can be generated based on the metadata elements generated by process 1200 of FIG. 12 for legal outcomes. A GUI 1500 may also present search results or results of statistical analysis using charts or a combination of tables and charts. For example, GUI 1500 of FIG. 15 includes a table 1502 and a chart 1504 that summarize damage type and damage amount for the segment of legal data on which analytics were applied. In this case, analytics were applied to all intellectual property cases in N.D.Cal. between 2000-01-01 and 2015-03-07. Chart 1504 also subdivides the segment of legal data by year.

Legal Analytics Based on Timing

Figure 16:
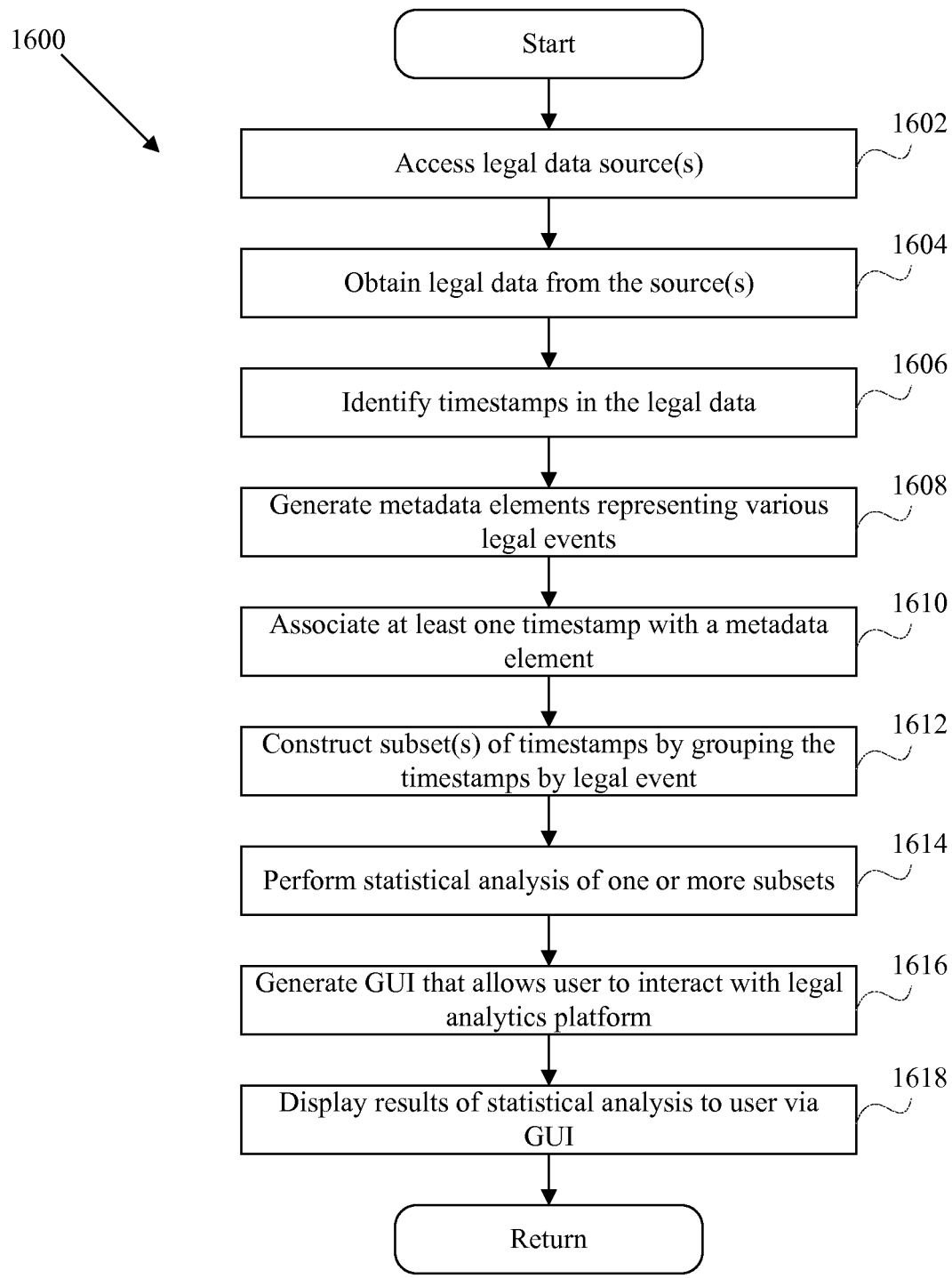
FIG. 16 is a flow diagram depicting general steps in a legal analytics process as may occur in some embodiments.

FIG. 16 is a flow diagram depicting general steps in a legal analytics process 1600 as may occur in some embodiments. The process 1600 may be largely similar to process 600 of FIG. 6 for analyzing legal entities or process 1200 of FIG. 12 for analyzing legal events. At block 1602, a legal analytics platform accesses one or more sources of legal information, and at block 1604, the legal analytics platform retrieves legal data from at least one of the sources. At block 1606, the legal analytics platform can identify timestamps in the legal data. A "timestamp" is any sequence of characters or encoded information that identifies when a certain legal event occurred. Generally, the timestamp includes a date and time, although the legal data may be ordered chronologically in some embodiments.

The legal analytics platform can then associate each timestamp with a particular legal event. At block 1608, the legal analytics platform can generate metadata elements that represent various legal events, such as termination of a case, commencement of a trial, commencement of a claim construction hearing, etc. In some embodiments, a user is able to specify a particular legal event (e.g., issuance of declaratory judgment, filing of notice of appeal) for which a metadata element is generated. At block 1610, the legal analytics platform can tag each timestamp, thereby associating each timestamp with at least one metadata element (i.e., at least one legal event).

At block 1612, the legal analytics engine can group the timestamps by legal event. Each group represents a subset of timestamps that are associated with a specific legal event. For example, a subset of timestamps may be associated with commencement of claim construction hearings. At block 1614, the legal analytics platform (e.g., via analytics engine 404) can perform statistical analysis using at least one group/subset of timestamps. The statistical analysis may include determining the mean, median, minimum, maximum, etc., values for the group/subset. At block 1616, the legal analytics platform can generate a GUI that allows a user to interface with the platform, specify search parameters, view search results, etc. At block 1618, the GUI can display the results of the statistical analysis and allow the user to select or modify the group(s)/subset(s) of timestamps on which statistical analysis is performed.

Figure 17:
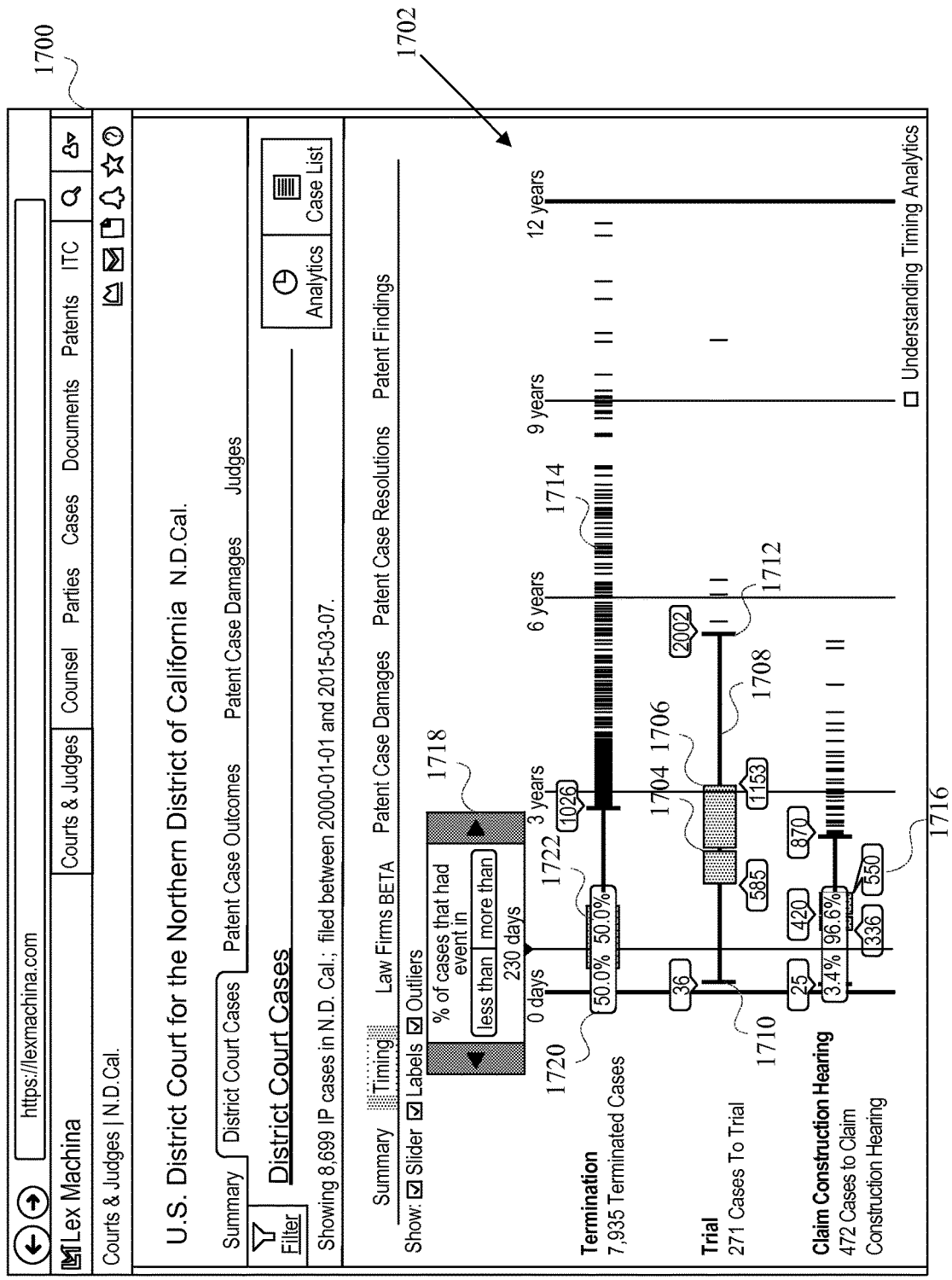
FIG. 17 is a screenshot of a GUI displaying a summary of a statistical analysis of groups of timestamps as may occur in some embodiments.

FIG. 17 is a screenshot of a GUI 1700 displaying a summary of a statistical analysis of groups of timestamps as may occur in some embodiments. The summary of statistical measurements can presented using a box plot 1702, although other charts may also be used such as bar charts, pie charts, line charts, doughnut charts, bubble charts, etc. The box plot 1702 can feature various measurements, including the median 1704, a box 1706 that extends from a lower quartile to an upper quartile, and whiskers 1708 that extend from the box to a minimum value 1710 and/or a maximum value 1712. In some embodiments, the minimum value 1710 and the maximum value 1712 are determined after excluding outliers 1714, which lie outside of the box 1706 by a distance of more than 1.5 times the width of the box (i.e., difference between upper quartile and lower quartile).

The box plot 1702 may also include labels 1716 for some or all of the measurements featured by the plot. For example, FIG. 17 includes labels 1716 for the minimum value 1710, lower quartile, median value 1704, upper quartile, and maximum value 1712. In some embodiments, the box plot 1702 includes an interactive control element 1718, which may also be referred to as a "slider," that can be positioned within the box plot 1718 by a user. Placement of the control element 1718 identifies an input time that is used to determine a lower ratio 1720 and an upper ratio 1722. The lower ratio 1720 represents the percentage of timestamps in a group/subset that fall below the input time, while the upper ratio 1722 represents the percentage of timestamps in the group/subset that exceed the input time. If the user moves the control element 1718 and changes the input time, the lower ratio 1720 and upper ratio 1722 are updated. The ratios may be updated in real-time. The measurements of FIG. 17 can also be presented as part of a textual summary (e.g., a table) rather than, or in addition to, a graphical summary. In some embodiments, the GUI 1700 allows the user to modify the appearance of the box plot 1702. For example, the user may elect to conceal the control element 1718, the labels 1716, the outliers 1714, etc.

In some embodiments it may be desirable to have the legal data associated with some combination of legal entities, legal events, etc. That is, the database may be searchable by any combination of the aforementioned metadata elements. For example, GUI 1500 of FIG. 15 illustrates a segment of legal data that was determined by a user who first chose a legal entity ("N.D.Cal.") and then chose a legal event (e.g., damages type, damages amount). Similarly, GUI 1700 of FIG. 17 illustrates a segment of legal data that was determined by a user who first chose a legal entity ("N.D.Cal.") and then elected to view a summary of timestamps grouped by legal event.

Legal Document Mapping

Figure 18:
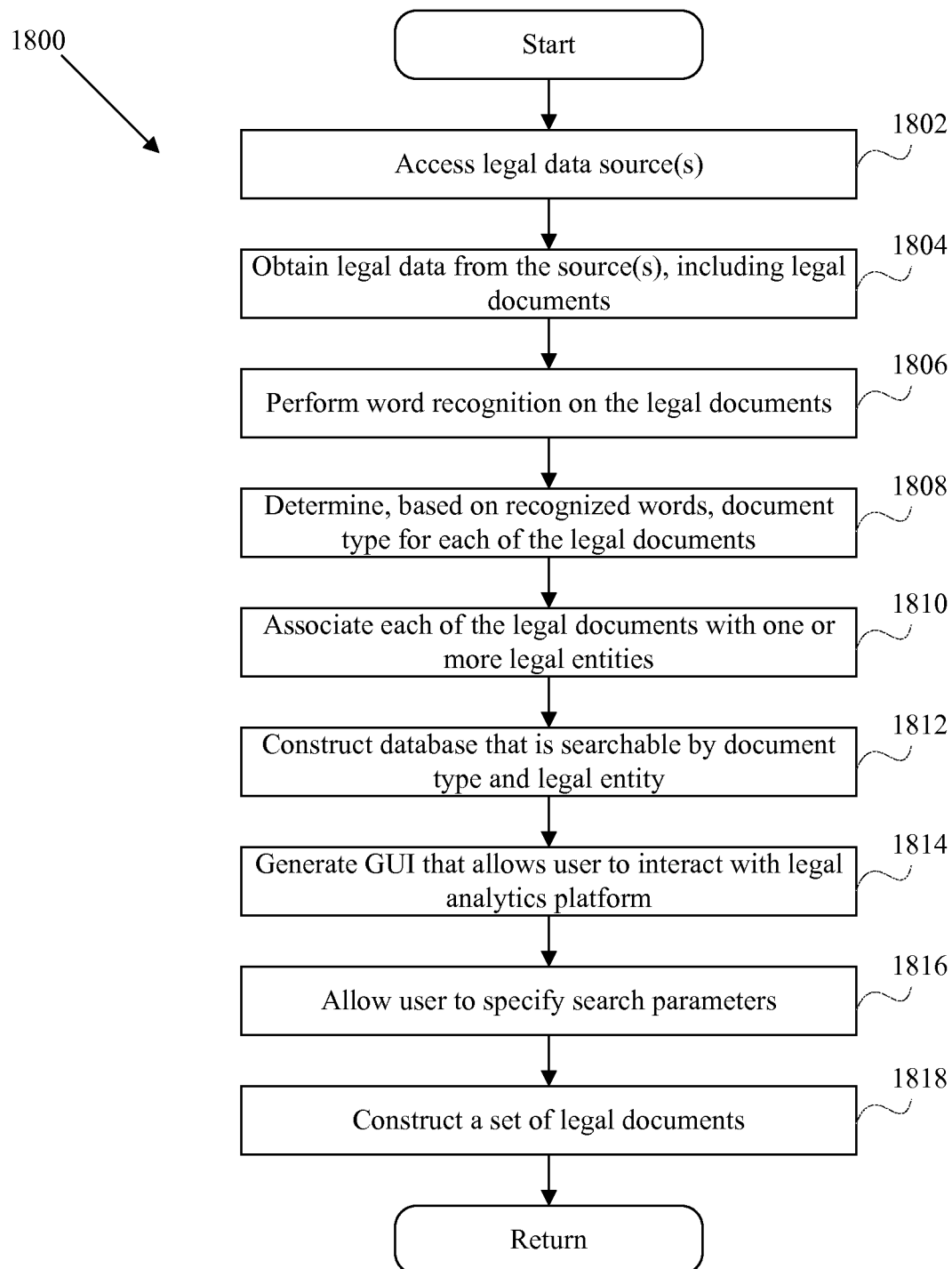
FIG. 18 is a flow diagram illustrating a process for retrieving, preparing, and delivering legal data according to various embodiments.

FIG. 18 is a flow diagram illustrating a process 1800 for retrieving, preparing, and delivering legal data according to various embodiments. Similar to those embodiments described above, process 1800 includes a legal analytics platform accessing one or more sources of legal information and retrieving legal data from at least one of the sources, as shown at blocks 1802 and 1804. The legal data can include electronic legal documents, as well as case information, docket information, intellectual property information, etc.

At block 1806, the legal analytics platform (e.g., via an OCR module) can perform word recognition on the electronic documents, and, at block 1808, the platform can establish a document type for each of the electronic documents based on any recognized words. The document type may be a motion, order (e.g., regarding injunction, dismissal, stay, consolidation, transfer, limine, etc.), pleading, complaint, counterclaim, corporate disclosure statement, answer, appeal, judgment, opinion, trial, claim construction order, final judgment, jury verdict, finding of fact and conclusion of law, etc. The legal analytics platform may also be configured to identify electronic documents as an unknown type (e.g., platform is unable to readily identify the document as a known document type). "Unknown" documents could then be flagged for manual (i.e., human) review. At block 1810, each legal document can be associated with one or more legal entities. For example, a legal document may be associated with a particular jurisdiction, judge, and law firm.

At block 1812, the legal analytics platform can construct a database that includes some or all of the electronic documents and is searchable by document type. The database may be the same database as those described by processes 600, 1200, or 1600 of FIGS. 6, 12, and 18, respectively. That is, the database may be searchable by any combination of document type, legal entity, legal event, timestamp, etc. At block 1814, the legal analytics platform (e.g., via GUI module 410 of FIG. 4) can generate a GUI that allows a user to interact with the legal analytics platform and search the database. At block 1816, the GUI allows the user to specify search parameters, which may include some combination metadata elements referring to document type, legal entity, etc.

In some embodiments, the legal analytics platform constructs sets of legal documents that, together, create a "motion chain." This process, illustrated by block 1818, may also be called motion mapping. Each set can include a motion and any electronic documents that affect the motion's outcome, such as a response to the motion, a reply to the response, or an order that determines the outcome of the motion. The set may also indicate what legal entities created the original document(s) (e.g., party, law firm) and/or the legal entities involved in ruling on the motion (e.g., judge, jurisdiction). A set can also include an outcome summary that indicates whether the motion was ultimately granted or denied. Motion mapping can make it easier for a user to identify useful electronic documents in the legal data.

Sets of legal documents could be created for other legal events as well. For example, if a patent is asserted during litigation, the user may want key documents related to the prosecution history (e.g., application, office actions, responses) associated with the asserted patent.

Figure 19:
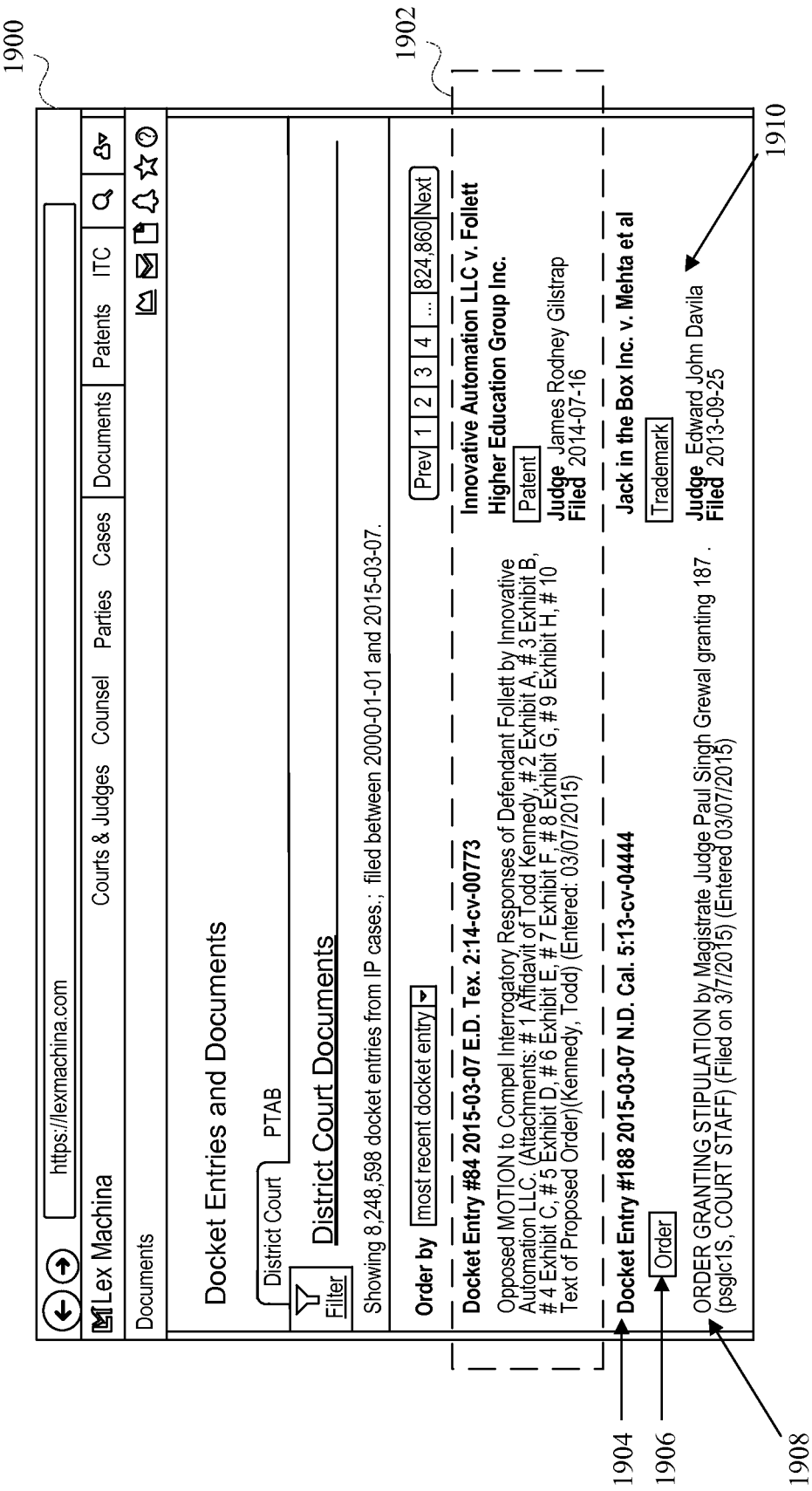
FIG. 19 is a screenshot of a GUI presenting legal documents as may occur in some embodiments.

FIG. 19 is a screenshot of a GUI 1900 presenting legal documents as may occur in some embodiments. The GUI 1900 may be configured to present some portion or all of a legal document, a selectable hyperlink to the legal document, or a document entry 1902. Each document entry 1902 can include one or more selectable hyperlinks 1904, an indicator 1906 that identifies document type, an outline 1908, or metadata elements 1910 for legal entity, legal event, timestamp, etc. As described above, the electronic documents stored in the database may be searchable by any combination of metadata elements, thereby allowing the user to quickly find useful legal documents.

Figure 20:
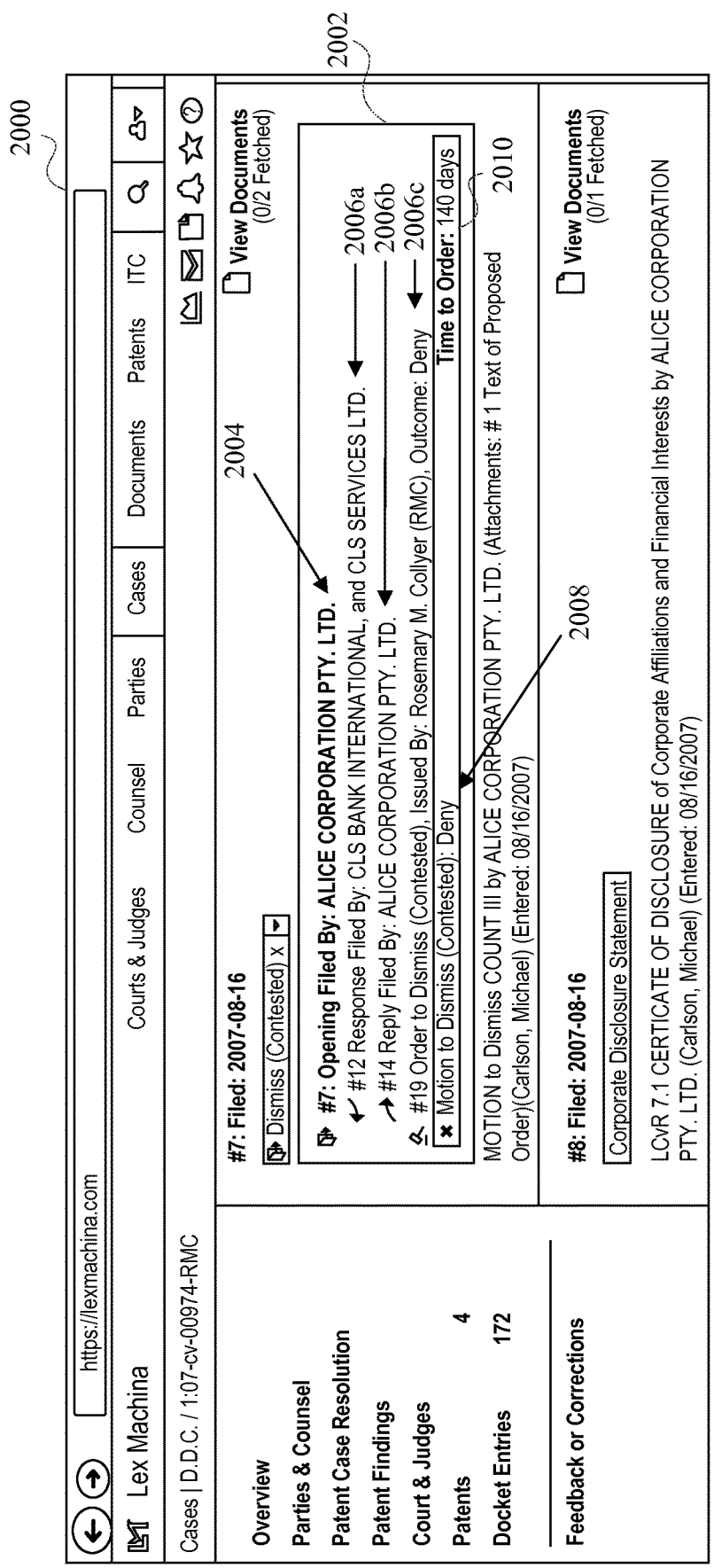
FIG. 20 is a screenshot of a GUI presenting a set of legal documents as may occur in some embodiments.

FIG. 20 is a screenshot of a GUI 2000 presenting a set of legal documents 2002 as may occur in some embodiments. As described above, the legal analytics platform can be configured to construct sets of legal documents to form "motion chains." Each set can include a motion and any legal documents that affect the motion's outcome, such as responses, replies, or orders. For example, the set of legal documents 2002 presented by GUI 2000 includes a motion 2004, various subsequent documents 2006a-c, an outcome summary 2008, and a duration measurement 2010. The outcome summary 2008 indicates whether the motion 2004 was ultimately granted or denied, while the duration measurement 2010 calculates the total time from filing of the motion 2004 to issuance of the order 2006c. The duration measurement 2010 may be calculated using, for example, the timestamps described above with respect to FIGS. 16-17.

Computer System

Figure 21:
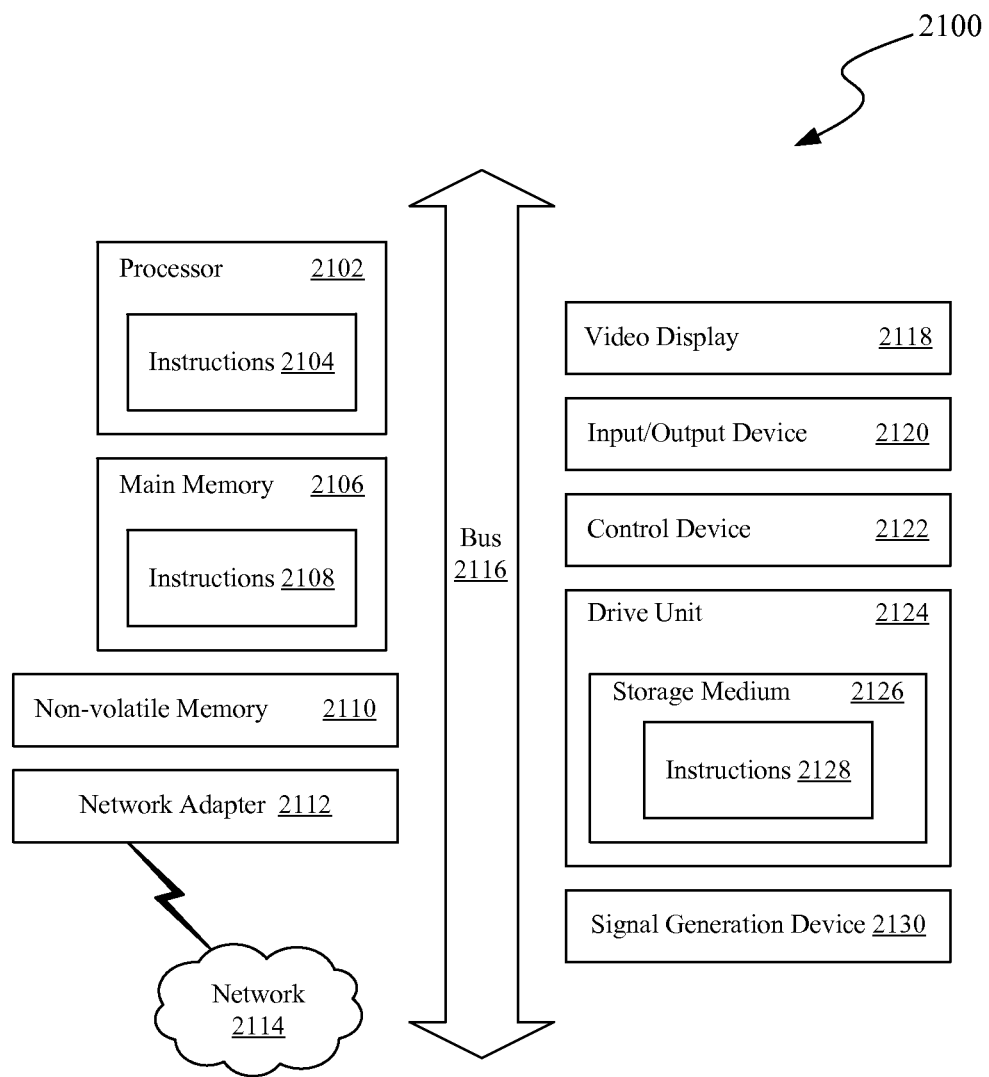
FIG. 21 is a block diagram illustrating an example of a computing system in which at least some operations described herein can be implemented.

FIG. 21 is a block diagram illustrating an example of a computing system 2100 in which at least some operations described herein can be implemented. The computing system may include one or more central processing units ("processors") 2102, main memory 2106, non-volatile memory 2110, network adapter 2112 (e.g., network interfaces), video display 2118, input/output devices 2120, control device 2122 (e.g., keyboard and pointing devices), drive unit 2124 including a storage medium 2126, and signal generation device 2130 that are communicatively connected to a bus 2116. The bus 2116 is illustrated as an abstraction that represents any one or more separate physical buses, point to point connections, or both connected by appropriate bridges, adapters, or controllers. The bus 2116, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the computing system 2100 operates as a standalone device, although the computing system 2100 may be connected (e.g., wired or wirelessly) to other machines. In a networked deployment, the computing system 2100 may operate in the capacity of a server or a client machine in a client-server network environment, or as a peer machine in a peer-to-peer (or distributed) network environment.

The computing system 2100 may be a server computer, a client computer, a personal computer, a user device, a tablet, a laptop computer, a PDA, a cellular telephone, an iPhone, an iPad, a Blackberry, a processor, a telephone, a web appliance, a network router, switch or bridge, a console, a hand-held console, any portable/mobile hand-held device, or any machine capable of executing a set of instructions (sequential or otherwise) that specify actions to be taken by the computing system 2100.

While the main memory 2106, non-volatile memory 2110, and storage medium 2126 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 2128. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 2104, 2108, 2128) set at various times in various memory and storage devices in a computer, and that, when read and executed by one or more processing units or processors 2102, cause the computing system 2100 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 2110, floppy and other removable disks, hard disk drives, optical disks (e.g., Compact Disk Read-Only Memory (CD ROMS), Digital Versatile Disks, (DVDs)), and transmission type media such as digital and analog communication links.

The network adapter 2112 enables the computing system 2100 to mediate data in a network 2114 with an entity that is external to the computing device 2100, through any known and/or convenient communications protocol supported by the computing system 2100 and the external entity. The network adapter 2112 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 2112 can include a firewall that can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can include, but are not limited to, intrusion-prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

What is claimed is:

1. A method for acquiring and processing legal data, the method comprising:
   accessing a source of legal information;
   retrieving legal data from the source of legal information;
   receiving input modifying the legal data by modifying text previously incorrectly recognized and inputting supplemental data by adding metadata to the legal data;
   identifying one or more portions of a data set derived from the legal data and the supplemental data, each portion including a legal event;
   generating a metadata element for each legal event identified in the one or more portions, wherein a plurality of metadata elements of different types are generated for at least one of the portions;
   associating each of the one or more portions with at least one of the plurality of metadata elements;
   identifying, based on one or more recognized words, references to legal events within the one or more portions of the data set;
   identifying a first portion, within the one or more portions of the data set, in which a reference to a legal event was found;
   associating the first portion with a different metadata element corresponding to the legal events referenced in the first portion;
   constructing a legal database that is searchable by legal event;
   generating a graphical user interface;
   receiving input, via the graphical user interface, from a user specifying search parameters used to identify a segment of the data set;
   presenting, via the graphical user interface, analytic results that include a graphical summary; and
   receiving input from the user adjusting the analytic results by modifying the search parameters.

2. The method of claim 1, wherein the legal event is a procedural event, a damages type, a damages amount, a case resolution, a remedy type, or a patent finding.

3. The method of claim 2, wherein the case resolution comprises a likely settlement, procedural, a claimant win, or a claim defendant win.

4. The method of claim 1, wherein the analytic result includes a table and a chart that summarize the segment of the legal data selected by the user for analysis.

5. The method of claim 4, wherein the chart is a line graph, a bar chart, a pie chart, a doughnut chart, or a histogram.

6. The method of claim 1, wherein the source of legal information is Public Access to Court Electronic Records (PACER), Patent Application Information Retrieval (PAIR), or Electronic Document Information System (EDIS).

7. A legal analytics platform comprising:
   a data crawler configured to:
      access a plurality of legal information sources; and
   an outcome coding module configured to:
      identify one or more portions of the legal data, each portion including information regarding at least one legal event;
      generate a metadata element for each distinct legal event identified within the one or more portions of legal data; and
      associate at least one metadata element with at least one of the one or more portions, the at least one metadata element identifying legal events present in the at least one portion; and
   a legal analytics engine, comprising memory and a processor coupled to the memory, configured to:
      identify, based on one or more recognized words, references to legal events within the one or more portions of the data set;
      identify a first portion, within the one or more portions of the data set, in which a reference to a legal event was found;
      associate the first portion with a second metadata element corresponding to the legal events referenced in the first portion;
      construct a database that includes the legal data or the plurality of metadata elements and is searchable by legal event;
      receive input, via a graphical user interface, from the user specifying search parameters that are used to identify a segment of the legal data; and
      present, via the graphical user interface, analytic results to the user.

8. The legal analytics platform of claim 7, further comprising:
   a normalizing module configured to:
      identify a variant of a legal entity name in a portion of the legal data; and
      associate the portion with the legal entity name rather than the variant.

9. The legal analytics platform of claim 8, wherein the normalizing module is further configured to:
   receive an authoritative version of the legal entity name that is known to be correct, wherein the authoritative version of the legal entity name is used to identify the variant.

10. The legal analytics platform of claim 8, wherein the legal analytics engine is further configured to:
receive input, via the graphical user interface, from the user adjusting the analytic results by modifying the search parameters.

11. The legal analytics platform of claim 7, wherein the analytic results are presented using a table and a chart.

12. The legal analytics platform of claim 11, wherein upon hovering over or selecting a piece of the chart, an entry in the table corresponding to the piece is highlighted.

13. The legal analytics platform of claim 11, wherein the chart is a line graph, a bar chart, a pie chart, a doughnut chart, or a histogram.

14. A method for applying legal analytics, the method comprising:
accessing a source of legal information;
retrieving legal data from the source of legal information;
identifying, based on recognized words, references to legal events in the legal data;
identifying portions of the legal data that include a reference to a legal event;
associating at least some of the portions with a first metadata element corresponding to the legal event referenced in each portion, wherein a plurality of metadata elements of different types are generated for at least one of the portions;
constructing a database that includes the legal data and is searchable by legal event;
receiving input specifying search parameters that are used to identify a segment of the legal data, the search parameters including one or more metadata elements that specify one or more legal events;
identifying, based on one or more of the recognized words, references to legal entities within the portions of the legal data;
identifying a first portion, within the portions of the legal data, in which a reference to a legal entity was found;
associating the first portion with a second metadata element corresponding to the legal entity referenced in the first portion; and
presenting analytic results to the user.

15. The method of claim 14, further comprising:
receiving input from an administrator manually modifying the legal data or inputting supplemental data.

16. The method of claim 15, further comprising:
generating a graphical user interface configured to:
present the analytic results to the user; and
receiving input from the user adjusting the analytic results by modifying the search parameters.

17. The method of claim 16, further comprising:
identifying one or more inaccuracies in the legal data; and
normalizing the one or more inaccuracies.

18. The method of claim 17, wherein the inaccuracies are misspellings of legal entity names.

19. The method of claim 14, wherein the analytic results include a chart that graphically represents the segment of legal data.

20. The method of claim 16, further comprising receiving input from the user searching the database by legal event or legal entity.

21. The method of claim 16, wherein the legal entity is a judge, a jurisdiction, a lawyer, a law firm, a party to a lawsuit, a patent, a trademark, a copyright, or any combination thereof.

22. The method of claim 17, wherein normalizing the inaccuracies comprises:
identifying a variant of a legal entity name in a second portion of the portions; and
associating the second portion with the legal entity name rather than the variant.

23. A method for applying legal analytics, the method comprising:
accessing, via an interactive graphical user interface, a legal analytics platform configured to:
access one or more legal information sources over a network;
retrieve electronic legal data from the one or more legal information sources;
identify and associate portions of the electronic legal data with at least one of a plurality of metadata elements, the metadata elements identifying legal events present in each portion, wherein a plurality of metadata elements of different types are generated for at least one of the portions;
identify, based on one or more recognized words, references to legal events within the portions of the data set;
identify a first portion, within the portions of the data set, in which a reference to a legal event was found;
associate the first portion with a second metadata element corresponding to the legal events referenced in the first portion; and
construct a database that is searchable by legal event and is communicatively coupled to the legal analytics platform;
specifying search parameters that are used to search the database, the search parameters including one or more metadata elements that correspond to one or more legal events;
causing the legal analytics platform to identify a segment of the electronic legal data that satisfies all of the search parameters;
reviewing, via the interactive graphical user interface, analytic results that include a graphical summary of the segment of the electronic legal data; and
modifying the search parameters by adding a new metadata element or removing a previously-specified metadata element.

* * * * *